(12) United States Patent
Zimmer et al.

(10) Patent No.: US 9,022,446 B2
(45) Date of Patent: May 5, 2015

(54) GLASS RUN WITH APPLIQUE ASSEMBLY

(75) Inventors: John P. Zimmer, Canton, MI (US); Rod Bara, Rochester Hills, MI (US); Karl Deline, Romulus, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 75 days.

(21) Appl. No.: 13/125,715

(22) PCT Filed: Oct. 26, 2009

(86) PCT No.: PCT/US2009/062093
§ 371 (c)(1),
(2), (4) Date: Dec. 16, 2011

(87) PCT Pub. No.: WO2010/048619
PCT Pub. Date: Apr. 29, 2010

(65) Prior Publication Data
US 2012/0091751 A1    Apr. 19, 2012

Related U.S. Application Data

(60) Provisional application No. 61/108,366, filed on Oct. 24, 2008.

(51) Int. Cl.
*B60R 13/04*    (2006.01)
*B60J 5/04*    (2006.01)

(52) U.S. Cl.
CPC ............... *B60J 5/0402* (2013.01); *B60R 13/04* (2013.01)

(58) Field of Classification Search
CPC ............. B60J 1/08; B60J 1/12; B60J 1/17; B60J 5/0402; B60J 5/0411; B60J 10/0022; B60J 10/0051; B60J 10/0062; B60J 10/0068; B60J 10/04; B60J 10/042; B60R 13/04

USPC .............. 296/1.08, 93, 146.2, 146.5, 146.9, 296/146.16; 49/440, 441, 475.1, 490.1, 49/492.1, 495.1
See application file for complete search history.

(56) References Cited

U.S. PATENT DOCUMENTS

| 4,441,301 A | 4/1984 | Benson |
| 4,934,101 A * | 6/1990 | Hannya et al. .................. 49/502 |
| 5,092,078 A * | 3/1992 | Keys ............................... 49/441 |
| 5,358,764 A * | 10/1994 | Roberts et al. .................. 428/31 |
| 5,702,148 A | 12/1997 | Vaughan et al. |

(Continued)

FOREIGN PATENT DOCUMENTS

| GB | 2 087 465 A | 5/1982 |
| WO | WO 2006055911 A2 * | 5/2006 |
| WO | WO 2007/016571 A2 | 2/2007 |

OTHER PUBLICATIONS

International Search Report and Written Opinion for PCT/US2009/062093.

*Primary Examiner* — Glenn Dayoan
*Assistant Examiner* — Jason S Daniels
(74) *Attorney, Agent, or Firm* — Fay Sharpe LLP

(57) ABSTRACT

A trim or weatherstrip assembly secured to an associated vehicle. The assembly includes a cover portion that overlies an associated vehicle adjacent an edge. A connection member is defined on the cover portion. A fastener portion includes a detent connection member having first and second portions for operatively and alternatively engaging the connection member in a shipping, first position and in an installed, second position.

22 Claims, 22 Drawing Sheets

(56) References Cited

U.S. PATENT DOCUMENTS

| | | |
|---|---|---|
| 6,416,113 B1 | 7/2002 | Page |
| 6,612,074 B1 * | 9/2003 | Kaye et al. .................. 49/441 |
| 6,811,194 B1 * | 11/2004 | Gaertner et al. ............ 296/1.08 |
| 8,205,389 B1 * | 6/2012 | Kesh .............................. 49/440 |
| 2005/0235569 A1 | 10/2005 | Shumulinskiy |
| 2007/0175100 A1 * | 8/2007 | Brancaleone et al. ......... 49/440 |
| 2007/0262608 A1 * | 11/2007 | Saito ........................ 296/146.7 |
| 2008/0030046 A1 * | 2/2008 | Krause ...................... 296/146.2 |
| 2009/0152894 A1 * | 6/2009 | Kang ........................ 296/146.9 |

* cited by examiner

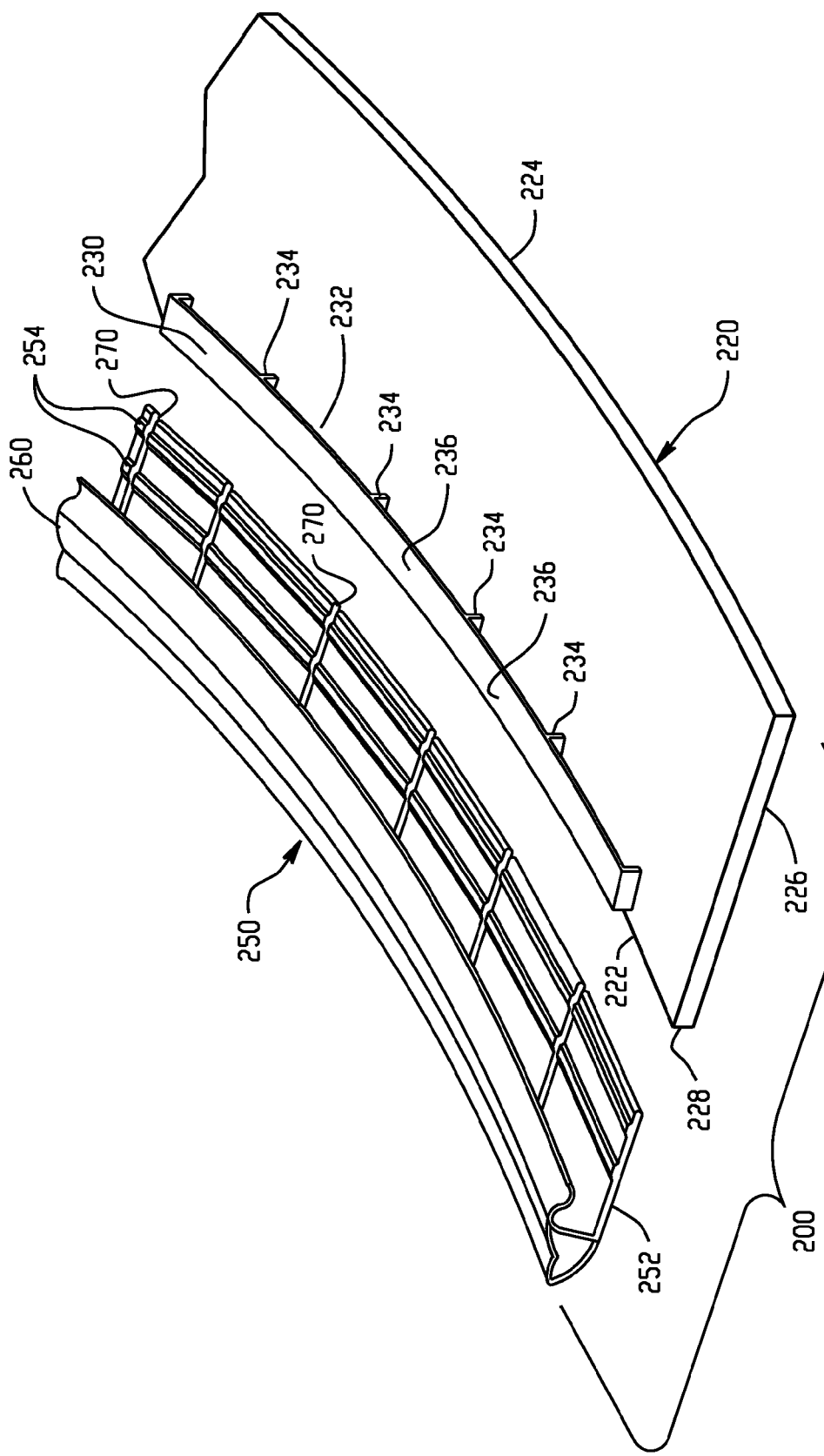

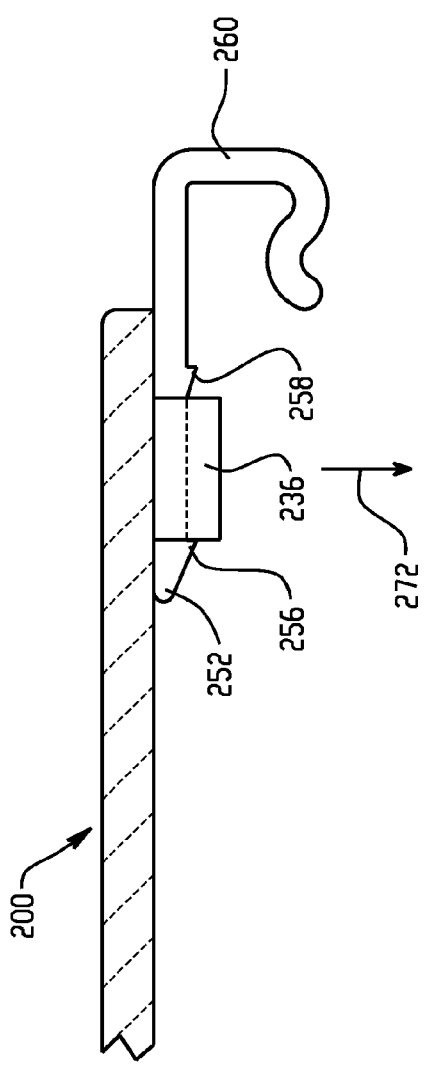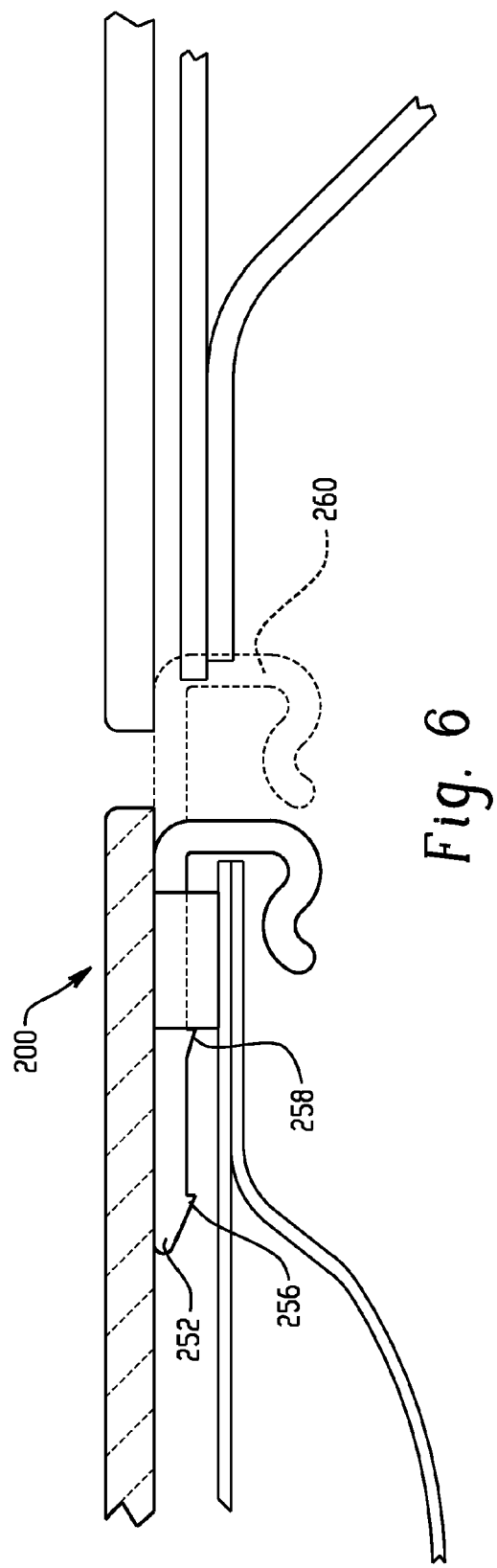

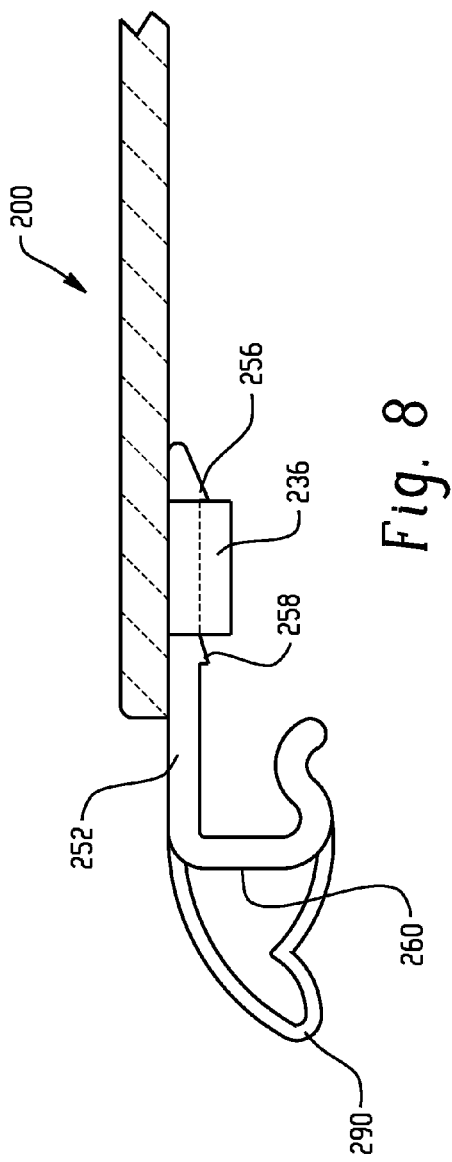
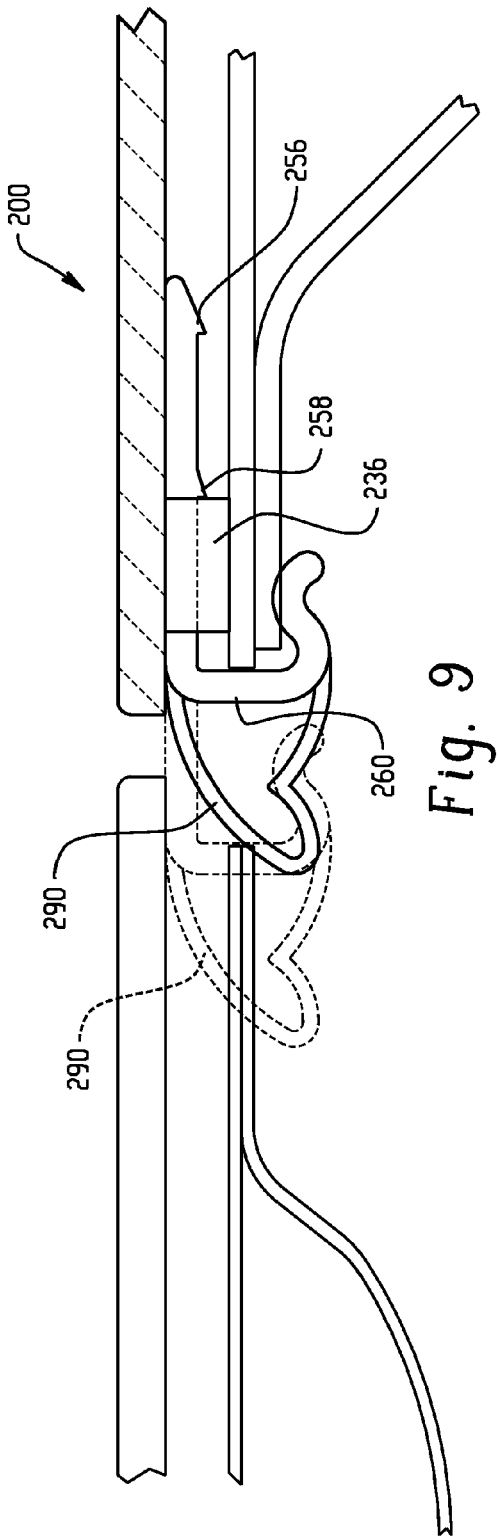

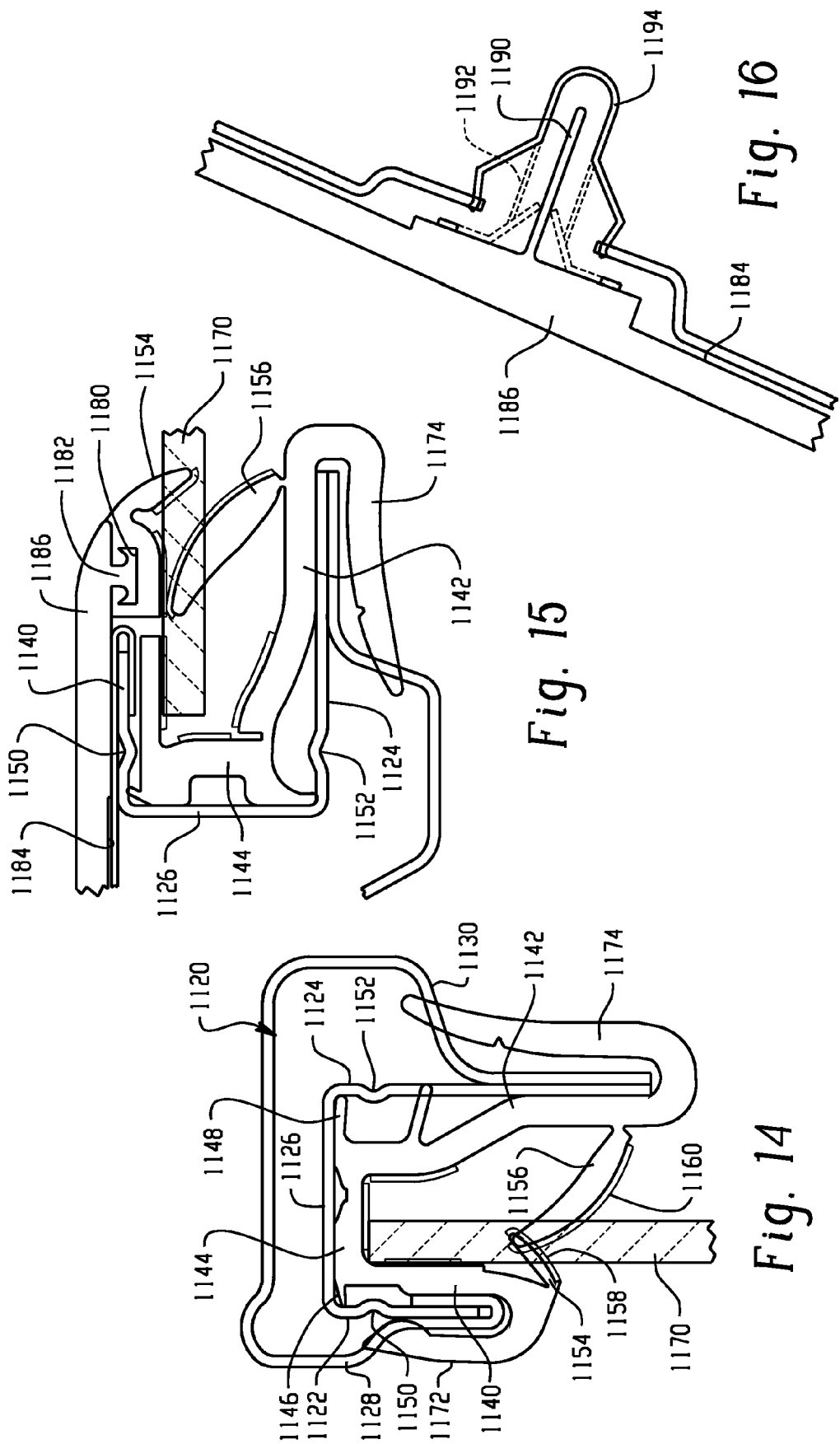

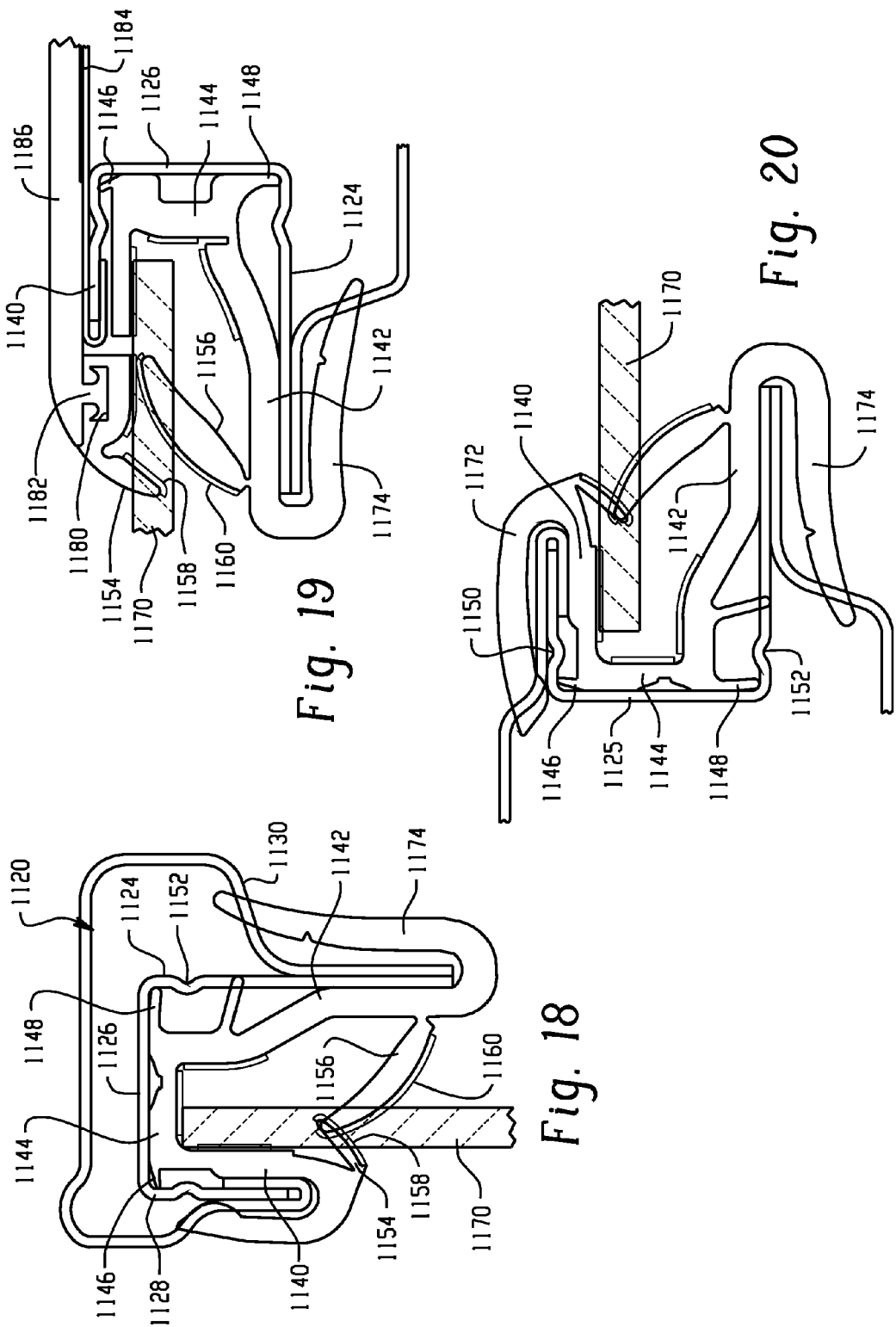

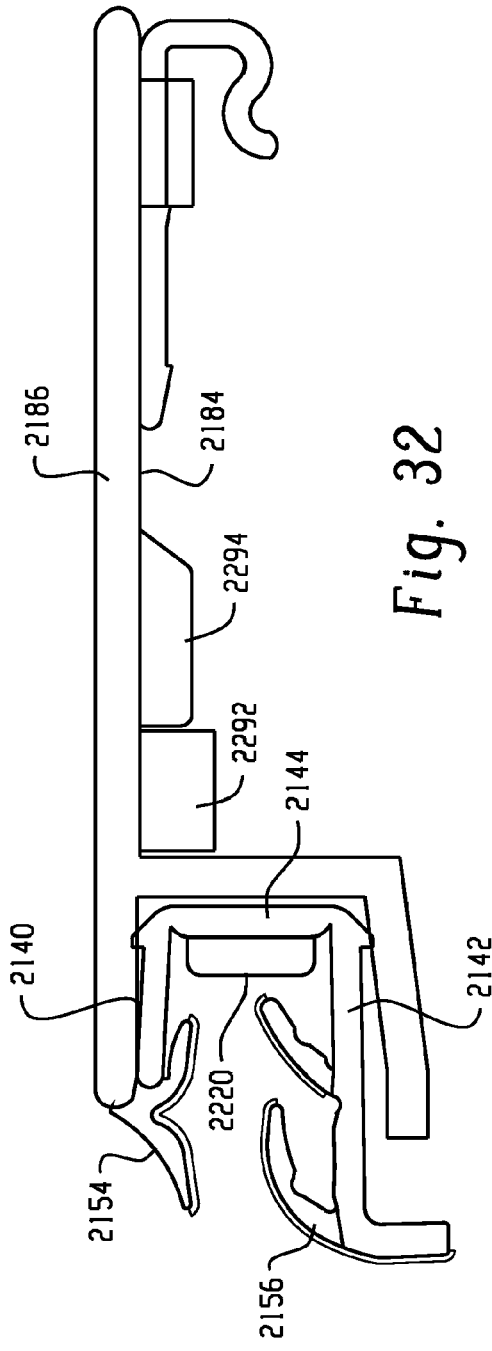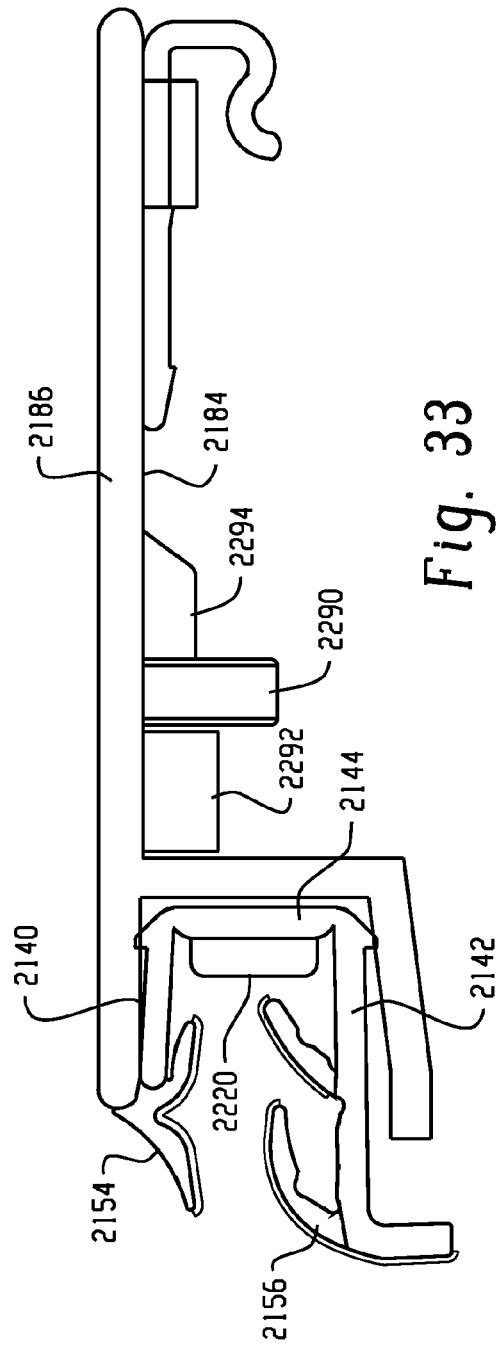

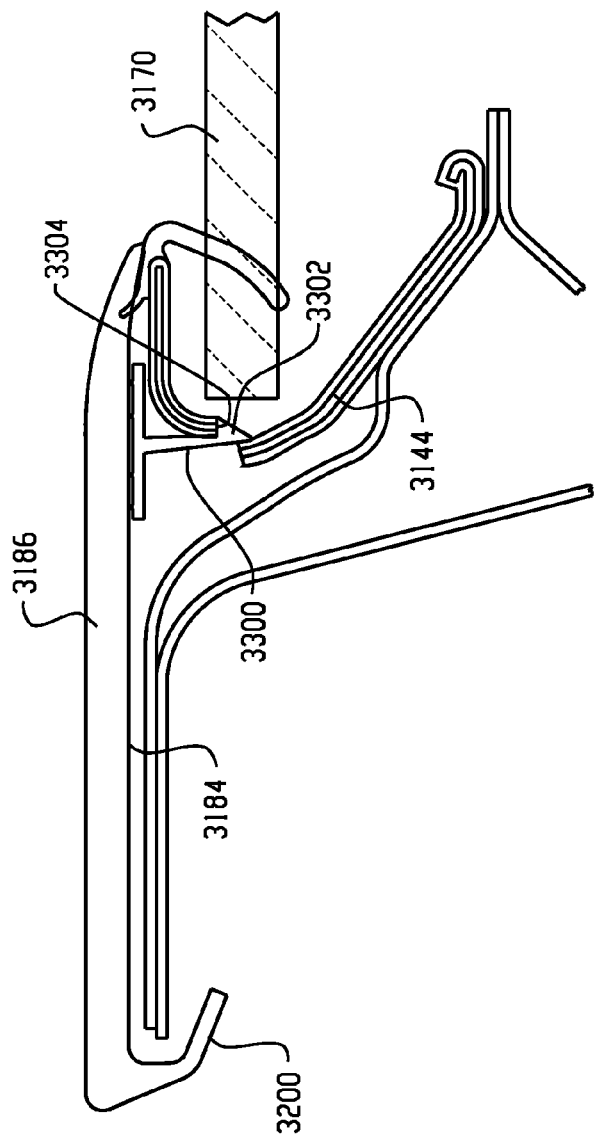
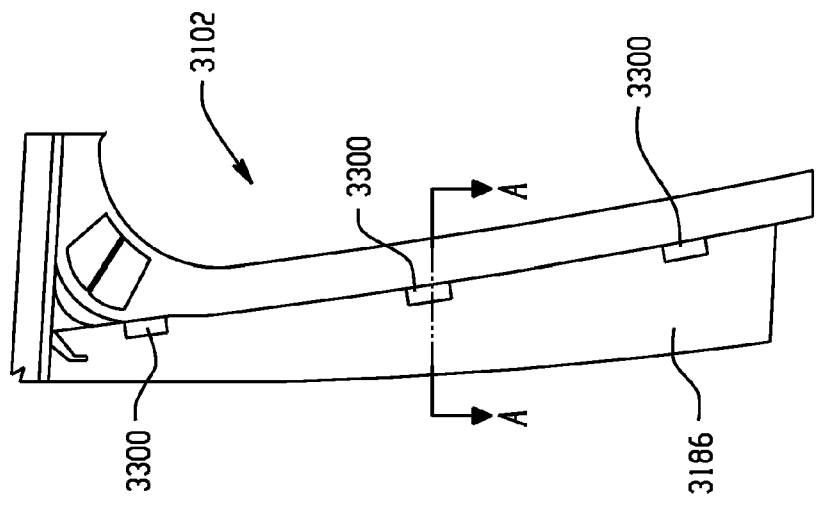
Fig. 36
Fig. 34

GLASS RUN WITH APPLIQUE ASSEMBLY

BACKGROUND OF THE DISCLOSURE

This application further relates to automotive vehicles, and more particularly to a purchased in assembly (PIA) that combines a high or low gloss appliqué with a glass run assembly.

It is well known to provide weatherstripping about the perimeter of a vehicle window. Such a weatherstrip is generally referred to as a "glass run assembly" and guides opposite front and rear edges of the window glass from beneath the belt line in an automotive vehicle door until the window is disposed in a fully raised position where a third portion of the continuous glass run assembly provides sealing along the upper edge of the window or the header portion of the window opening in the door. The glass run assembly may be supported, i.e., includes a rigid support or core such as a metal core or a rigid plastic core encased in a rubber or elastomer such as EPDM or a plastic, or the glass run assembly may be unsupported, i.e., has no interior rigid core, and instead is a rubber or thermoplastic. The glass run is typically secured to the vehicle door, for example, with pins, clips, tape, receipt in an associated channel, or through the common use of a U-shaped body where generally parallel legs of the body grippingly engage opposed surfaces of a door or body flange.

Separate and apart from the glass run is an appliqué. The appliqué is typically a wide, planar metal or plastic component positioned over a B-pillar, for example of the automotive vehicle. The contour of the appliqué and the portion of the vehicle on which the appliqué is applied, makes it difficult to apply the appliqué to the vehicle in a manner that covers an exposed edge of the pillar. Typically, separate pins or clips are provided to secure the appliqué to the vehicle.

As will be appreciated, the appliqué and the glass run assemblies are disposed closely adjacent one another along the pillar. Nevertheless, they are typically provided as separate components. This requires separate attachment for each component to the vehicle. This prior arrangement also requires separate assembly steps, separate inventory of components, and increases the chance for misalignment between the assembled components. Thus, a need exists for a combined assembly, or modular assembly, that integrates the previously separately supplied components in the manufactured glass run and appliqué.

Further, a need exists for an improved weatherstrip or trim member, and retainer, and associated method of manufacturing and installing such a weatherstrip or trim to a vehicle.

SUMMARY OF THE DISCLOSURE

A trim assembly, such as a trim member, includes a cover portion dimensioned to overlie a region of an associated vehicle adjacent an edge. A connection member is operatively associated with the cover portion. A fastener portion is dimensioned for engaging receipt on the associated vehicle and includes a detent connection member having first and second portions for operatively and alternatively engaging the connection member in a shipping, first position and in an installed, second position.

The detent connection member preferably includes a first shoulder that engages the connection member in a shipping position and a second shoulder spaced from the first shoulder that engages the connection member in the installed position.

In selected embodiments, a seal member extends outwardly from one of the trim or the fastener portion for engagement with the associated vehicle.

The fastener portion preferably includes a first hook member dimensioned for receipt over the associated edge of the vehicle.

The trim is preferably one of an elastomer or plastomer.

A method of manufacturing the trim assembly includes providing a cover portion dimensioned to overlie an associated vehicle adjacent an edge and a connection member operatively associated therewith. The method further includes providing a fastener portion dimensioned for engaging receipt on the associated vehicle and including a detent connection member that includes first and second portions for operatively and alternatively engaging the connection member in a shipping, first position and in an installed, second position.

The method includes forming the connection member as a channel dimensioned to receive the detent connection member therethrough.

The method further includes forming the detent connection member as first and second shoulders spaced apart in a direction of insertion into the connection member, and preferably the first shoulder extending a first height above the detent connection member and the second shoulder extending a different, second height above the detent connection member.

A method includes extruding the fastener portion, and in a preferred embodiment co-extruding a flexible seal.

The method further includes cutting the extruded fastener portion into individual segments.

A method of installing a trim to an associated vehicle includes advancing the trim generally perpendicular to a cover region with the detent connection member in the shipping position and subsequently moving the detent connection member to the installed position to retain the trim to the associated vehicle.

A primary benefit of the present disclosure is the ease of installation of the trim.

Still another advantage relates to the application in wide array of end uses.

Yet another feature is the ability to ship the assembly to a customer as a single piece.

Another benefit resides in the ability to combine multiple components into one modular assembled glassrun/appliqué, preferably with integrated clip attachments.

A further benefit is associated with improved fit and function with the automotive vehicle, as well as the associated improved appearance.

A still further benefit is found in the reduced manpower and part numbers requirements at the OEM assembly plant through provision of a purchased-in-assembly (PIA) glass-run/appliqué module.

Still other features and benefits will be found in the following detailed description.

BRIEF DESCRIPTION OF THE DRAWINGS

FIG. 4 is an enlarged perspective view of the disassembled components.

FIGS. 5 and 6 illustrate the first and second positions of the assembly and installation along an edge of an associated vehicle.

FIGS. 8 and 9 are views similar to FIGS. 5 and 6 and illustrating the inclusion of a cut-line seal on the assembly and installation to the edge of a vehicle.

FIGS. 14-16 are cross-sectional views along the lines A-A, B-B, and C-C, respectively, of FIG. 13.

FIGS. 18-20 are sectional views taken generally along the lines A-A, B-B, and C-C of FIG. 17, respectively.

FIG. 32 is a cross-sectional view similar to FIGS. 30 and 31 through a gusset portion of the appliqué.

FIG. 33 is a view similar to FIG. 32 through a pin locator of the appliqué.

FIGS. 34-36 are views through an alternative B-pillar appliqué assembly.

DETAILED DESCRIPTION OF THE PREFERRED EMBODIMENTS

Figure 2:
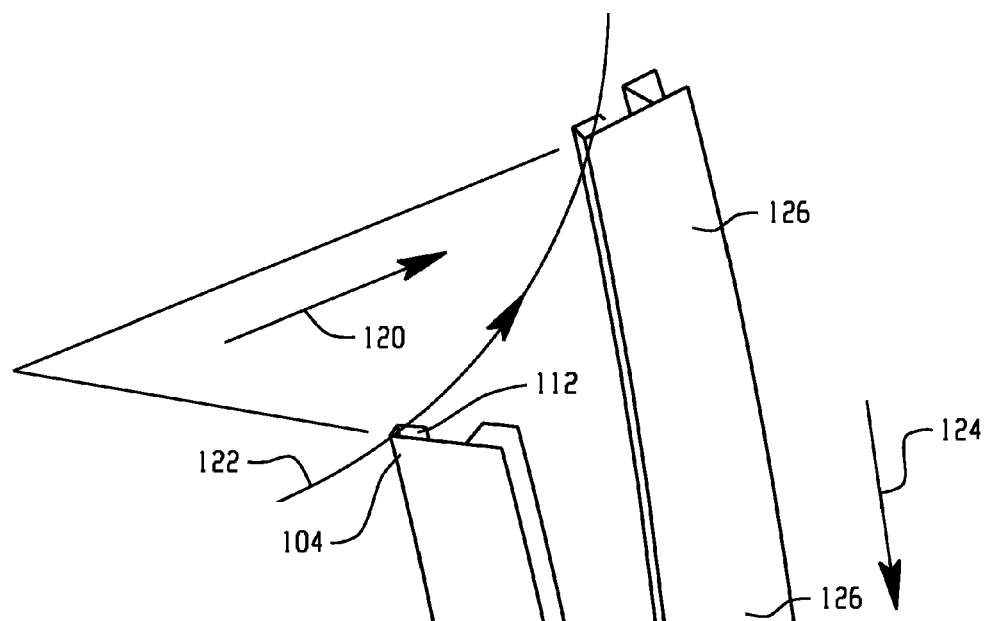
FIGS. 1 and 2 are schematic representations of an existing trim part and its installation as a B-pillar trim.
Figure 1:
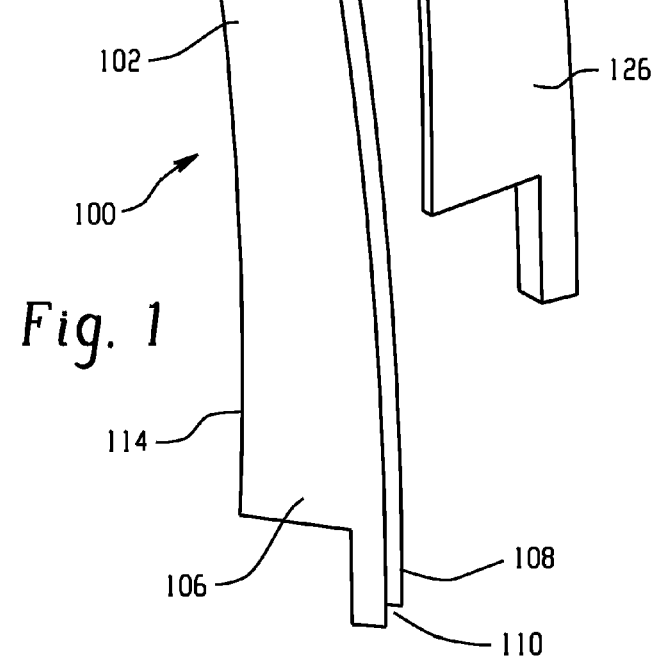

FIGS. 1 and 2 show a typical trim assembly, particularly a pillar trim member 100. The trim member is a generally elongated structure 102 having a first or upper end 104 and a second or lower end 106. Extending from the lower end 106 is a below belt portion 108 that has a conventional U-shaped channel structure or glass run channel 110 adapted to receive an edge of a movable window (not shown) in an associated vehicle door. This channel structure continues along the longitudinal extent of the structure 102 to the upper end 104. In this manner, the window edge is guided as it travels upwardly and downwardly relative to the trim member. The channel typically includes a glass run seal that seals about the edge of the window glass and aids in protecting the vehicle interior from the external environment.

While the glass run channel 110 extends along one longitudinal edge, an L-shaped hook 112 extends along the opposite edge of the trim member. The L-shaped hook 112 extends from a rear face of a panel or appliqué portion 114 that is a generally planar structure that overlies a portion of an associated automotive vehicle adjacent an edge of the vehicle sheet metal. For example, the appliqué is mounted to a pillar between the front and rear windows of an automotive vehicle.

More specifically, and with combined reference to FIGS. 1 and 2, the hook 112 is dimensioned to be received over an edge or flange of the vehicle, such as a rear door edge of the pillar. The hook 112 is positioned along the rear door edge of the pillar and hooked or mounted over the edge. This is represented by reference numeral 120. Reference numeral 122 then illustrates that the trim member is subsequently rotated toward the door so that the show panel or appliqué 114 overlies the generally planar surface of the vehicle. Next, the trim member is then slid downwardly as represented by reference numeral 124 to the final mounted position of the trim member on the vehicle. Thereafter, the clips or fasteners 126 are installed along the appliqué portion to secure the trim member to the vehicle. Thus as is evident, the current arrangement requires the trim member to be rotated, and slid down into position in order to wrap the cut-line area flange or edge. This difficult to load procedure limits the amount of flange that can be covered, and also limits the length of the below belt portion of the glass run channel. Moreover, this installation procedure and structural arrangement has a potential for damaging a painted surface because of this multi-step installation process.

Figures 3, 7:
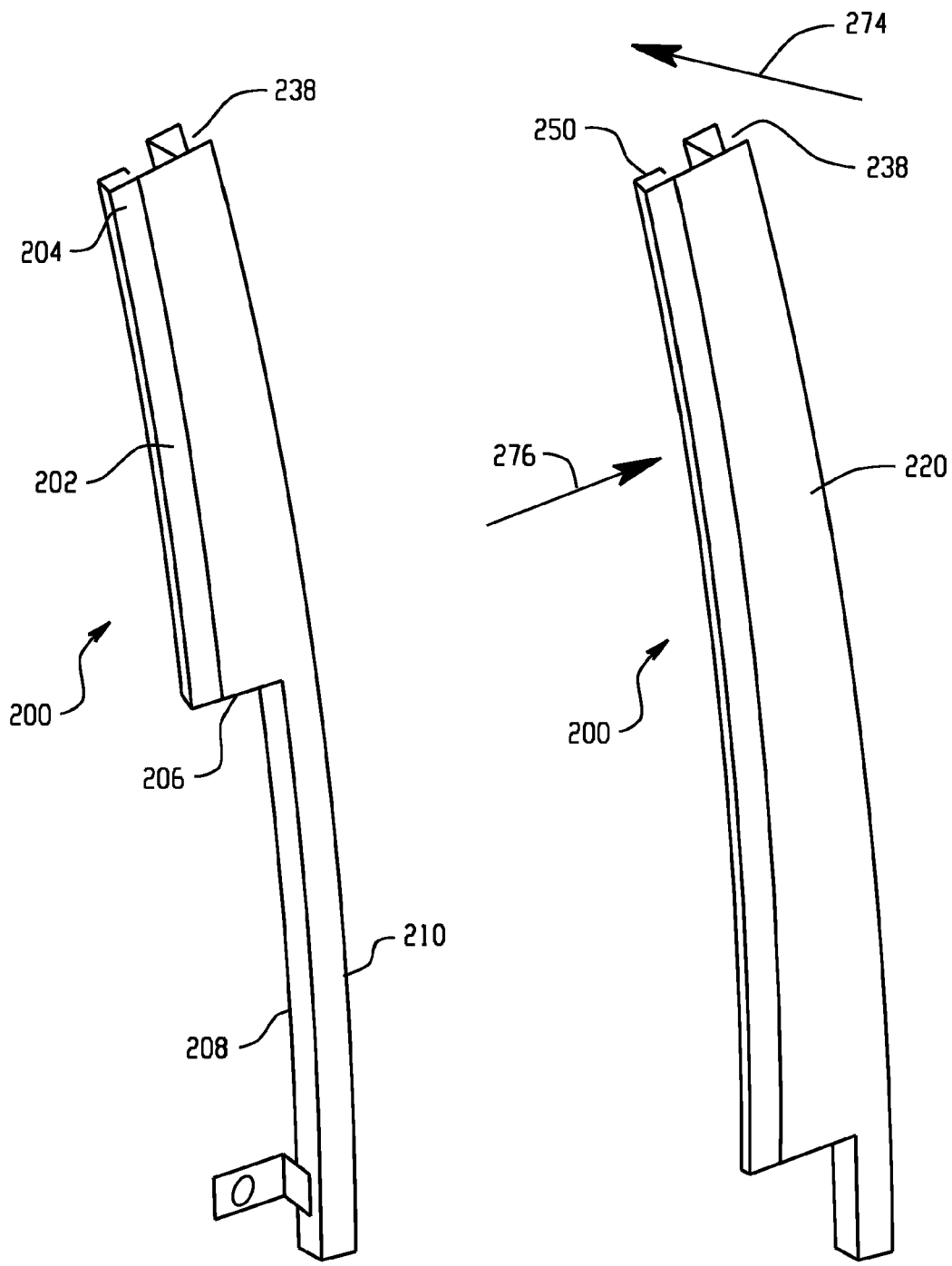
FIG. 3 is a perspective view of a trim panel in a preferred embodiment.
FIG. 7 is a perspective view schematically showing installation of the assembled trim.

Shown in FIG. 3 is a trim or weatherstrip assembly 200 of the present disclosure. For ease of illustration and reference, a first embodiment of the assembly will be described with reference to a pillar trim application. The trim member 200 is also an elongated structure 202 having a first or upper end 204 and a second or lower end 206. Noticeably different is the length of a below belt portion 208. This allows a glass run channel 210 to be extended and continues through the belt line which results in improved glass guiding and elimination of separate below belt components. Because of the complex mounting arrangement of the prior art illustrated in FIGS. 1 and 2, such an extended glass run channel through the belt line is not possible with current appliqués that must necessarily be wrapped about the cut-line sheet metal.

With continued reference to FIG. 3, and additional reference to FIGS. 4-6, the structure and method of installation of the preferred weatherstrip assembly or trim member will be described in greater detail. Particularly, as evident in FIG. 4, the weatherstrip or trim assembly is comprised of two components that are joined together. Specifically, a generally planar pillar trim portion 220 is received over a B-pillar of an automotive vehicle, and dimensioned to overlie and cover the pillar metal portion of the vehicle. A first longitudinal edge 222 runs generally parallel to a second edge 224, and each extending from the upper end 204 to the lower end 206. The dimension between the first and second edges 222, 224 may vary as required by the pillar dimensioning, however it will be appreciated that the trim portion has a first or outer surface 226 that has a desired texture, gloss, finish, etc. to provide the desired aesthetics for the vehicle. A second or inner surface 228 is disposed in facing relation with the B-pillar.

A connection member 230 extends from the inner surface 228 and is thus operatively associated with the cover portion 226 but on an opposite surface thereof. The connection member in the illustrated embodiment is preferably one or more channels 232 defined by stanchions or pillar portions 234 that are interconnected by spanning portions 236. The spanning portions and pillars thus define a series of adjacent channels that form the connection member on the trim portion 220 of the assembly. It will also be appreciated that the spanning portions have a predetermined dimension in an insertion direction i.e., from the first edge 222 toward the second edge 224, for reasons which will be described in further detail below.

The second or inner surface 228, or second edge 224 may also include a glass run channel 238 (FIGS. 3 and 7) formed therein. The channel is dimensioned to receive a seal assembly therein, such as a separate insertable seal assembly (not shown) that includes seal lips that engage opposite faces of the window along the edge and/or may include a high impact, low friction surface in a base portion of the channel. It is also contemplated that the glass run channel can include an integrated seal assembly formed directly on portions of the channel, rather than a separate insertable seal arrangement.

The trim member assembly 200 includes a second or fastener portion 250. The fastener portion has a generally J-shaped configuration in which an elongated first leg 252 includes a detent connection member 254. In the preferred embodiment, the detent connection member includes first and second engaging portions or shoulders 256, 258 (FIG. 5) that are spaced apart in the direction of insertion, i.e., from a terminal end of the first leg 252 toward the second leg 260. Moreover, the first and second shoulders 256, 258 of the detent connection member extend different heights from the leg, and preferably the second engaging shoulder has a greater height than the first shoulder 256.

The second leg 260 has a curvilinear contour that facilitates insertion of the fastener portion over the exposed sheet metal edge of the vehicle. For example, as illustrated in FIG. 6, the second leg is spaced from the spanning portion 236 a dimension slightly less than the width of the combined inner and outer door panels so that the fastener portion 250 grippingly engages the edge of the door. Preferably, the detent connection members of the fastener portion are divided into individual segments. That is, individual cutouts 270 divide the detent connection member into individual segments that are longitudinally spaced apart, and dimensioned and aligned for mating receipt of the pillars 234 of the trim portion. In this manner, the first leg 252 of the fastener portion is inserted into the individual channels 232 and a first, predetermined force is required to insert the first shoulder 256 beneath the spanning portion 236 whereby the first shoulder exits at the opposite end of the spanning portion and holds the trim portion 220 to the fastener portion. This relative position between the trim and fastener portions is defined as a shipping or first position of the trim assembly. The shipping position allows the fastener portion or retainer to be shipped with the trim member as a single piece from the supplier for installation by the OEM on the assembly line.

Thus, as more particularly shown in FIGS. 5 and 6, the first shoulder 256 is on one side of a spanning portion 236 while the second shoulder 258 is disposed on the other side in the first or shipping position. In this shipping position, the assembly can be handled by an assembly line operator/assembler and advanced as a single component in a direction perpendicular to the vehicle surface i.e., as shown by reference numeral 272. Once the assembly abuts against the B-pillar, for example, the fastener portion, and particularly the detent connection member, is moved to a second or installed position as shown in FIG. 6. Specifically, a second predetermined force is required to insert the second shoulder 258 beneath the spanning portion 236. Once the second shoulder 258 exits the opposite side of the spanning portion, the second shoulder 258 serves to prevent inadvertent removal of the trim portion from the fastener portion. Likewise, the thicker region of the fastener portion behind the second shoulder adds additional force to the gripping engagement of the first leg 252 and further secures the assembly to the edge of the associated vehicle.

The trim is typically a plastic material but can be formed of other materials as well. If plastic, formation of the channels 232 is easier as a molded component rather than an extruded component. The cross-sectional shape of the fastener portion, on the other hand, lends itself to being extruded, and subsequently, the first leg is modified to form the cutouts 270. Of course, as noted, portions of the trim can be extruded but it will be appreciated that the components can be molded as a single shot or alternatively as a dual shot structure.

FIG. 7 provides a simplified representation of the installation method. That is, the assembly 200 defined by the joined trim portion 220 and fastener portion 250, disposed in the first, shipping position, is directed perpendicularly toward the vehicle surface as represented by reference numeral 274. Once the assembly is located against the vehicle surface along the cut edge, the line operator then completes the installation by applying a force in the direction of reference numeral 276 that moves the fastener portion relative to the trim portion. More specifically, the applied force represented by reference numeral 276 advances the second shoulder 258 beneath the spanning portion 236 of the channels to dispose the trim portion and fastener portions in an installed, second position.

FIGS. 8 and 9 illustrate a related embodiment in which a cut-line seal 290 is added to the fastener portion. In all other respects, the structure and operation of the weatherstrip assembly is substantially identical to that described above. The seal may be a bulb type seal 290, or any other conventional seal configuration. The seal may also be advantageously coextruded with the remainder of the fastener portion due to the cross-sectional profile of this component. When installed for example on a rear door, the seal is adapted to engage the vehicle opening along a periphery of the rear door. Like FIG. 6, the illustration of FIG. 9 shows the weatherstrip assembly in the shipping position in broken line and the second, installed position in solid line.

Figure 10:
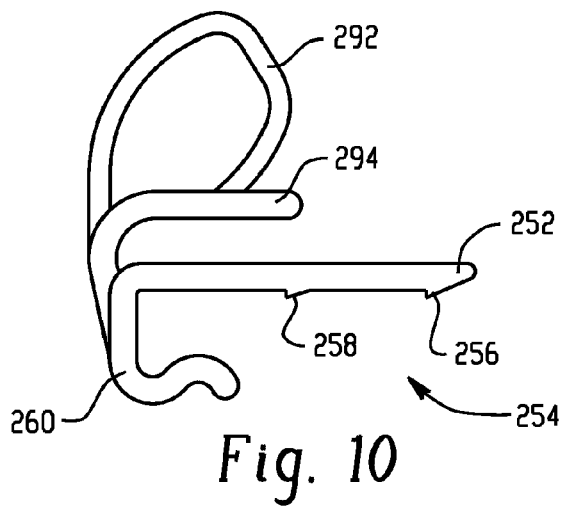
FIG. 10 is a cross-sectional view of an alternative embodiment of the seal retainer portion.
Figure 11:
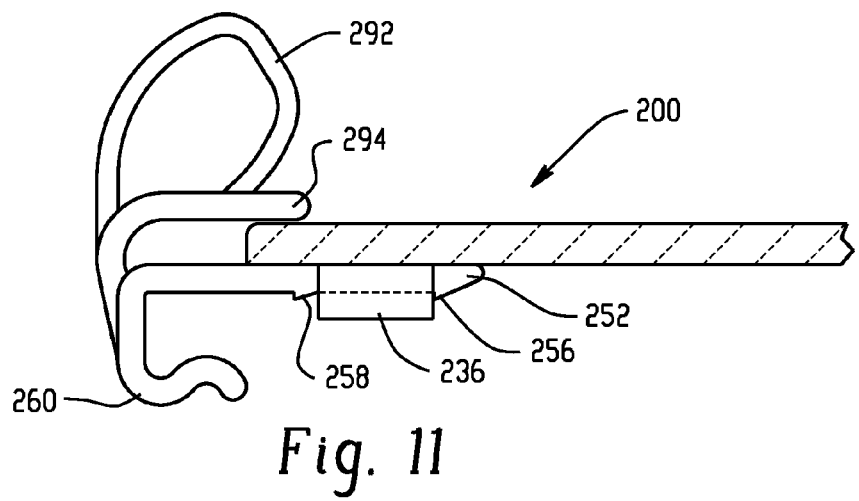
FIGS. 11 and 12 are cross-sectional views of the combined trim and retainer assembly in a first, shipping position and in a subsequent second or installed position.
Figure 12:
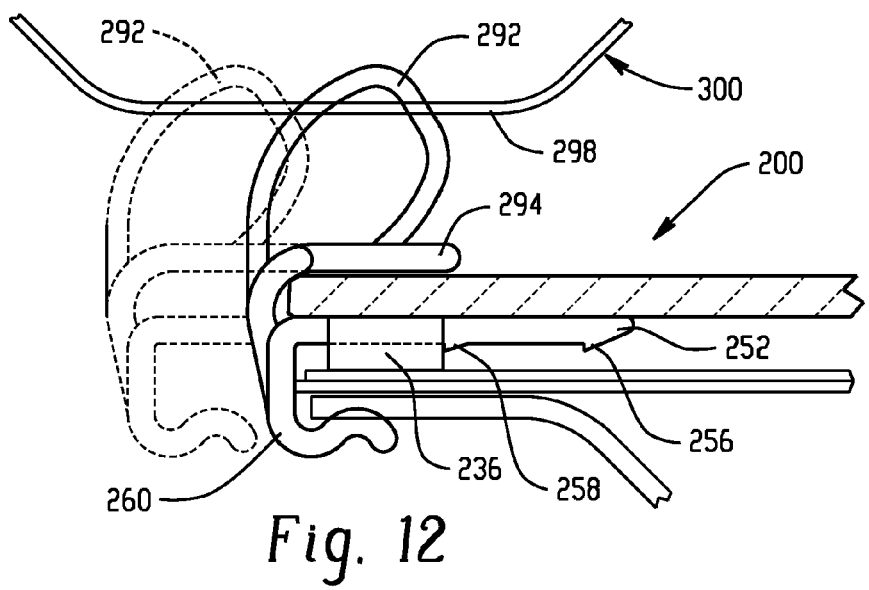

FIGS. 10-12 illustrate yet another embodiment of the weatherstrip assembly. In this arrangement, seal 292 is a hollow bulb type seal that is mounted on extension 294 and extends outwardly from the fastener portion 260. The extension is spaced from the first leg 252 to wrap around and accommodate, for example, a cowl or radiator trim element. The extension positions the seal 292 for engagement with an adjacent surface 298 such as a hood or trunk 300 (FIG. 12), etc. Again, the dotted line representation in FIG. 12 indicates the shipping position of the fastener portion which is actuated to the installation position.

The various embodiments illustrate a concept that allows the trim or weatherstrip assembly to be shipped to a customer as one part, while facilitating the elimination of retention clips or holes in the vehicle sheet metal. It also allows the part to be installed to the door in one linear motion rather than a complex series of installation steps. The components of the trim or weatherstrip assembly can be rigid or flexible plastics, EPDMs, or any other materials typically used in a trim or sealing application. The trim/weatherstrip assembly will also find use in a variety of automotive applications where a weatherstrip or trim part is used to enhance the vehicle appearance, help functionality, or cover sheet metal. For example, the door pillar trim, hood to cowl trim, hood to fender trim, hood to radiator trim, liftgate and sliding panel trim, are just other examples that are not intended to be limiting. This arrangement eliminates the use of additional fasteners, allows the use of inexpensive materials, and more importantly simplifies installation.

Figure 13:
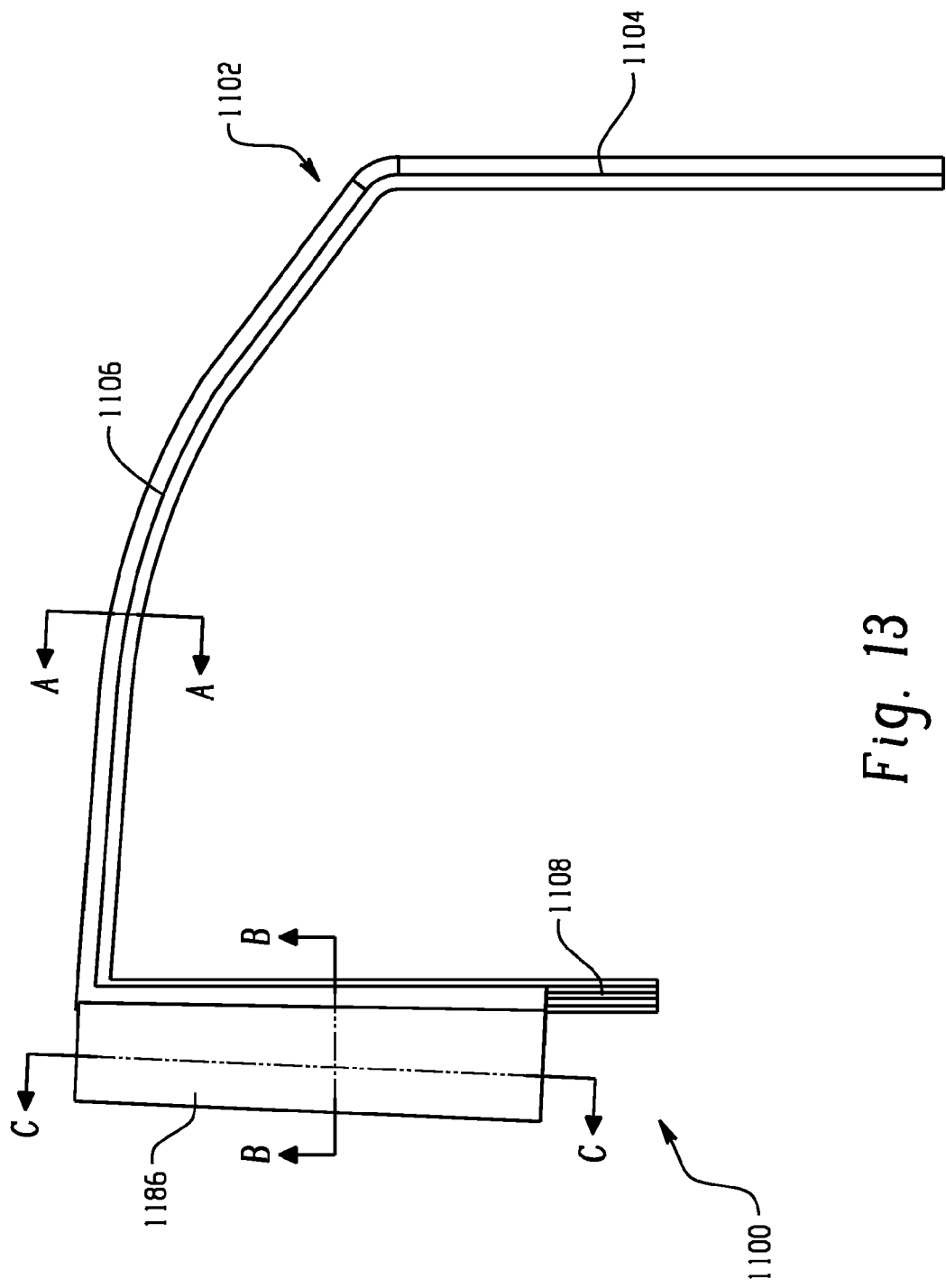
FIG. 13 is an elevational view of a channel mounted, unsupported, front door glass run and integrated plastic appliqué.
Figure 17:
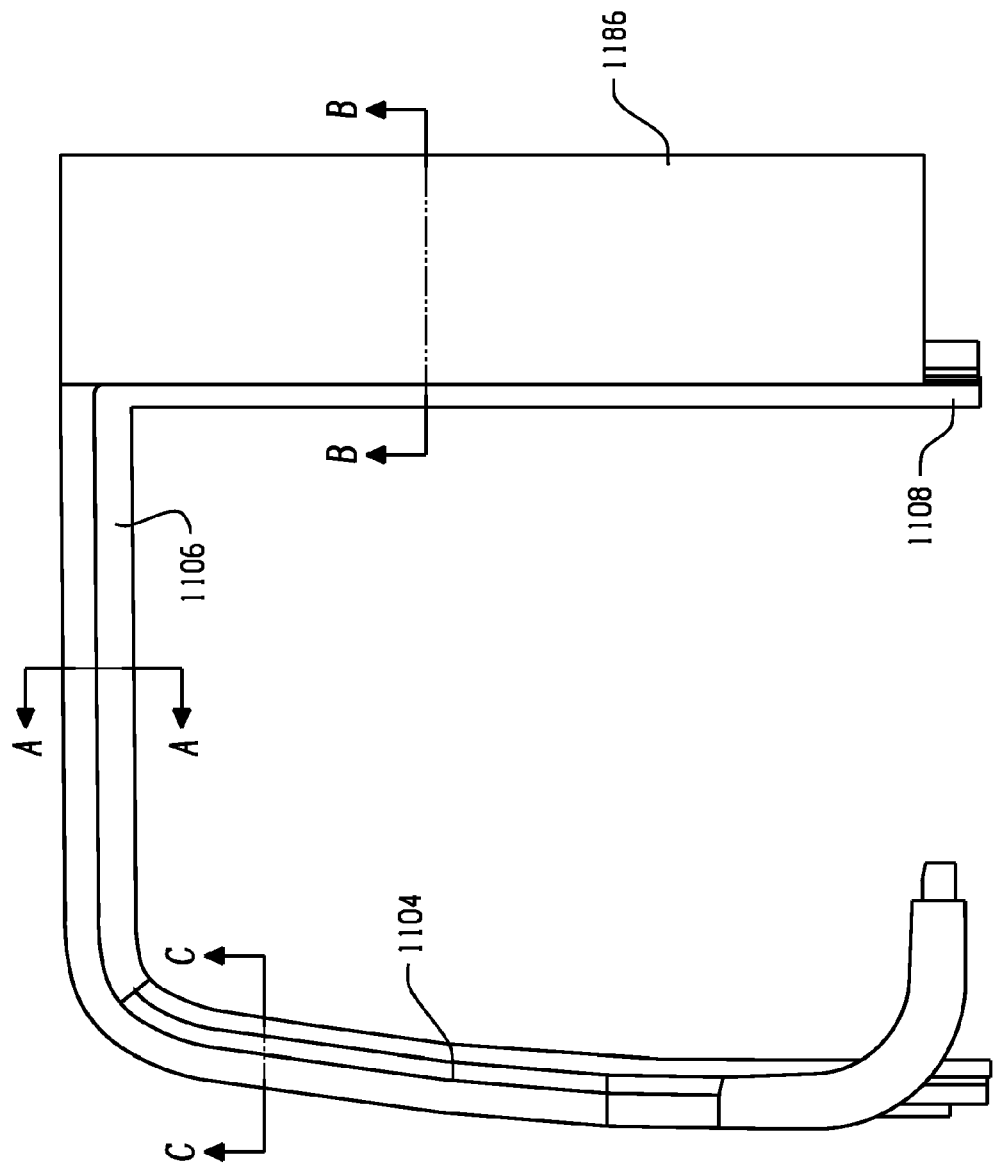
FIG. 17 is an elevational view of a rear door unsupported glass run with combined appliqué.

Turning to FIG. 13, there is shown a combined front door glass run and appliqué assembly 1100 that includes a glass run assembly 1102 that has a first or A-pillar portion 1104, a second or header portion 1106, and a third or B-pillar portion 1108. With continued reference to FIG. 13, and additional reference to FIGS. 14 and 15, the illustrated glass run assembly 1102 is an unsupported glass run assembly, which means that the cross-section does not employ a rigid internal support or core. Rather, the unsupported glass run assembly is received in an associated rigid support channel 1120. The support channel includes first and second legs 1122, 1124 that extend in generally parallel relation and are interconnected at one end by an interconnecting base member 1126. In addition, the channel, which is preferably a metal structure, is secured to other metal flange portions of the door, such as first support flange 1128, second support flange 1130. The unsupported glass run includes first leg portion 1140 and a second generally parallel leg portion 1142 interconnected by base portion 1144. Winged retention portions 1146, 1148 cooperate with detents or recesses 1150, 1152 formed in the first and second legs 1122, 1124, respectively.

First and second seal lips 1154, 1156 extend from the first and second legs 1140, 1142, respectively, and the seal lips are preferably located at or adjacent the outer ends of the legs. The lips include a low friction surface, for example a flock 1158, 1160 along the surface of the lip that slidably engages the movable window 1170 of the vehicle. In addition, cover lips 1172, 1174 extend in a reverse-bend relation to the outer terminal ends of the legs 1140, 1142. The cover lips are dimensioned to be received over corresponding flanges of the automotive vehicle. Thus, the cover lips provide an improved aesthetic surface along both the interior and exterior surfaces of the door.

FIG. 15 is a sectional view through the appliqué portion of the modular assembly, and particularly illustrates the interconnection of the appliqué with the glass run. This illustrates one type of mechanical engagement between the appliqué and the glass run portions of the modular assembly. Particularly, the outer leg 1140 of the glass run is modified to have a T-shaped groove 1180 that matingly receives a similarly dimensioned T-shaped extension 1182 from a first or rear surface 1184 of the appliqué 1186. This mating fit provides a positive mechanical engagement between the edge of the appliqué and the glass run portions. Approximately mid-way across the width of the appliqué are provided spaced locators shown as a projection or finger 1190 (FIG. 16) that extends generally perpendicularly outward from a rear surface 1184 of the appliqué. The projection is captured in a spring clip 1192 received in a recess 1194 of the B-pillar. Preferably, three or four of the projections 1190 are provided along the length of the appliqué, i.e., in a direction extending from the belt line toward the header of the vehicle. This provides a positive location of the appliqué relative to the vehicle body, and in conjunction with the mechanical engagement between the appliqué and glass run portions (1180, 1182, FIG. 15) to provide a modular assembly of a combined glass run and appliqué with integrated clip attachments. This modular assembly improves the fit and function, as well as the aesthetic appearance, of the appliqué relative to the vehicle. In addition, the modular assembly reduces manpower and part number requirements at the OEM's assembly plant.

FIGS. 17-20 illustrate a rear door glass run/appliqué assembly that is mechanically engaged in the same manner as the front door arrangement of FIGS. 13-16. For ease of illustration and brevity, like components are referenced by like reference numerals and the description above is fully applicable to the rear door assembly.

Figure 21:
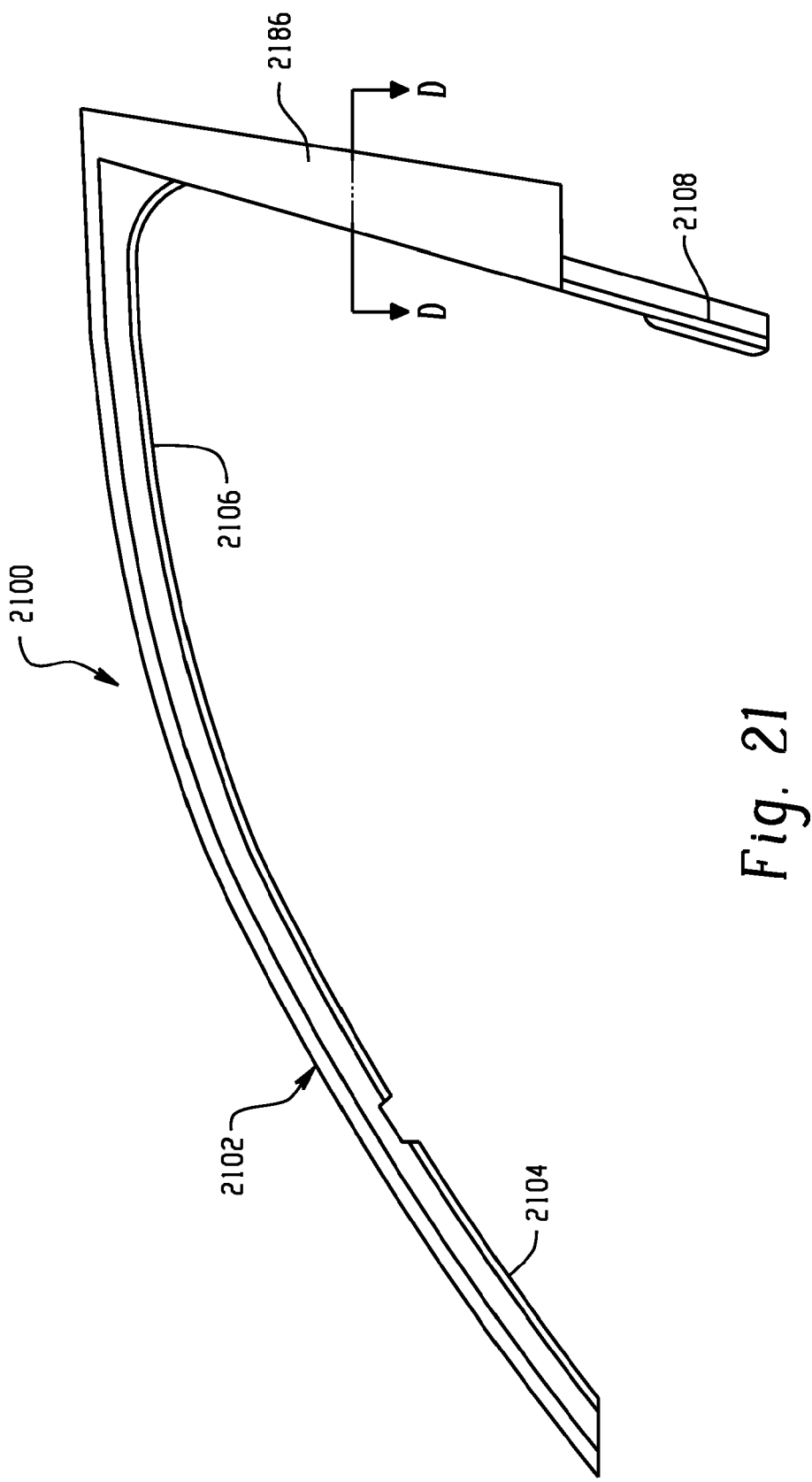
FIG. 21 is an elevational view of a glass run/appliqué assembly for a front door structure.
Figure 22:
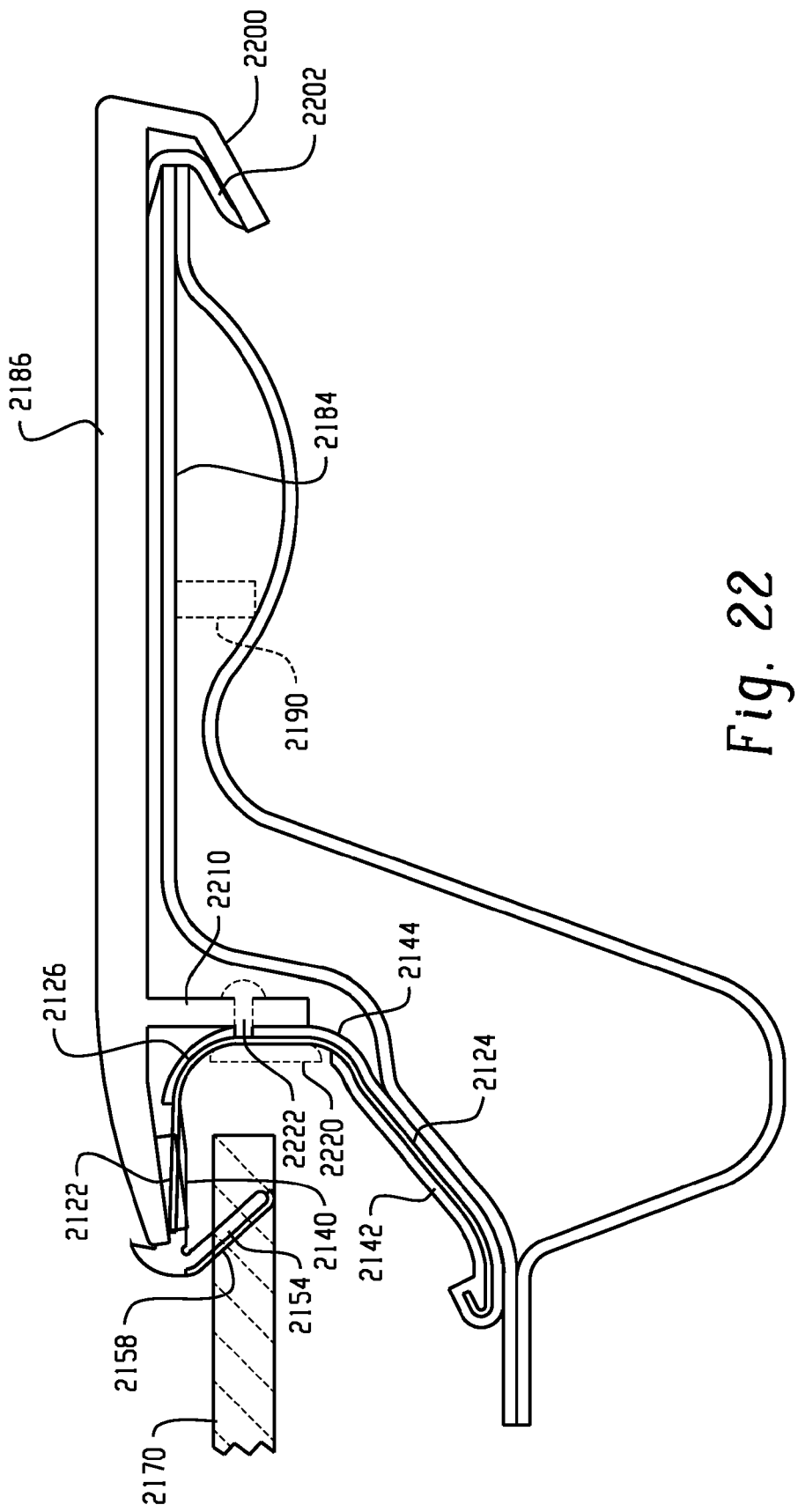
FIG. 22 is a cross-sectional view taken generally along the lines D-D of FIG. 21.

FIGS. 21-29 show another manner of attaching the appliqué portion to the glass run portion to form a modular assembly. For example, FIG. 21 is an elevational view of the glass run and appliqué assembly 2100 for a front door of an automotive vehicle. A first portion of the glass run assembly 2102 includes an A-pillar portion 2104 that merges into a header portion 2106 and is joined to a generally vertically extending B-pillar portion 2108. In this arrangement, the glass run is a supported assembly, i.e., it includes a rigid support member or core such as a rigid plastic or metal core to provide support to the elastomeric material such as an EPDM or plastic that forms a major portion of the glass run body. First and second legs 2140, 2142 are interconnected by base portion 2144. The core or internal support has a generally C-shape or U-shape conformation provided by first leg portion 2122, second leg portion 2124, and the third or interconnecting base portion 2126. Preferably, the core is co-extruded with the elastomeric material.

The general U-shape of the glass run permits the seal lips 2154, and particularly the low friction surface 2158 thereof, to slidably and sealingly engage an external surface of the window 2170.

The appliqué 2186 includes a hook or turned-in edge 2200 dimensioned for covering receipt over a distal edge of the pillar spaced from the glass run. The hook 2200 cooperates with an isolator 2202 interposed between the appliqué and the vehicle flange in this region to eliminate noise and vibration issues. Although not shown in this series of cross-sections, it will be appreciated that similar location projections or fingers can be used to accurately align the glass run and appliqué assembly relative to the B-pillar in a manner similar to that shown and described with reference to FIG. 16.

Figure 27:
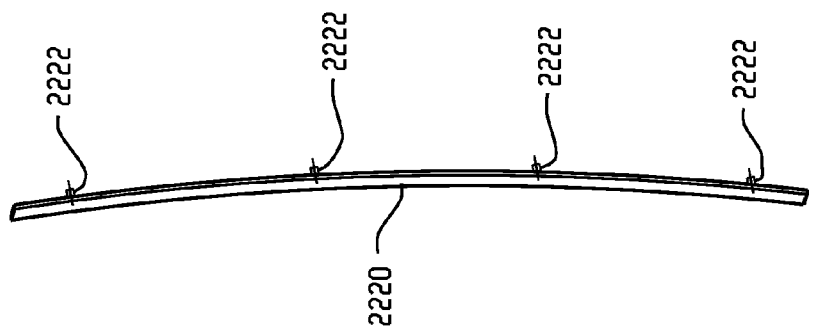
FIG. 27 is a perspective view of a glass track that also holds the appliqué to the vehicle.

With regard to the mechanical attachment of the appliqué portion with the glass run portion of the modular assembly, a second projection 2210 extends generally perpendicularly outward from a rear surface 2184 of the appliqué. The projection is positioned against an external surface of the base portion 2144 of the glass run. As shown in FIG. 27, a high molecular weight polyethylene or other suitable, durable material or glass track 2220 is received in the cavity defined by the legs of the glass run. This glass track material 2220 is preferably a plastic and preferably includes four projecting connection pins 2222 provided at longitudinally spaced locations along the glass run (FIG. 27). As originally manufactured, each of these pins is dimensioned for receipt through an opening provided in the core and elastomer in the base 2126, 2144 of the glass run. Likewise, a similarly dimensioned opening is provided in the projection 2210 of the appliqué. The appliqué is thus pre-assembled to the glass run by aligning the base of the glass run against the projection 2210, inserting the glass track 2220 into the cavity and abutting against the interior surface of base 2144 such that pins 2222 extend through aligned openings in the bases 2126, 2144 of the core and elastomer, as well as the openings in the projection 2210. Subsequently, the terminal ends of the pins 2222 are sonically welded, cold headed, or otherwise deformed to provide an enlarged dimension relative to the original cross-section of the pins that prevents removal of the pins from the aligned openings, i.e., by providing a mushroom-shaped cap to the end of the pins that mechanically locks the appliqué and glass run portions of the modular assembly together. Again, this interconnection provides a precise form and fit to the glass run/appliqué assembly so that the modular assembly 2100 can be positioned over the B-pillar of the vehicle. That is, the hook 2200 is received over the cut-line edge and isolator 2202, and suitable locator pins 2190 extending from the appliqué will assist in positioning the appliqué relative to the pillar. Since the appliqué and glass run are secured together, a precision fit of the appliqué relative to the vehicle, and a tight interfit between the appliqué and glass run are achieved. Moreover, assembly is simplified since these typically separate components are now joined in a modular assembly.

Figure 23:
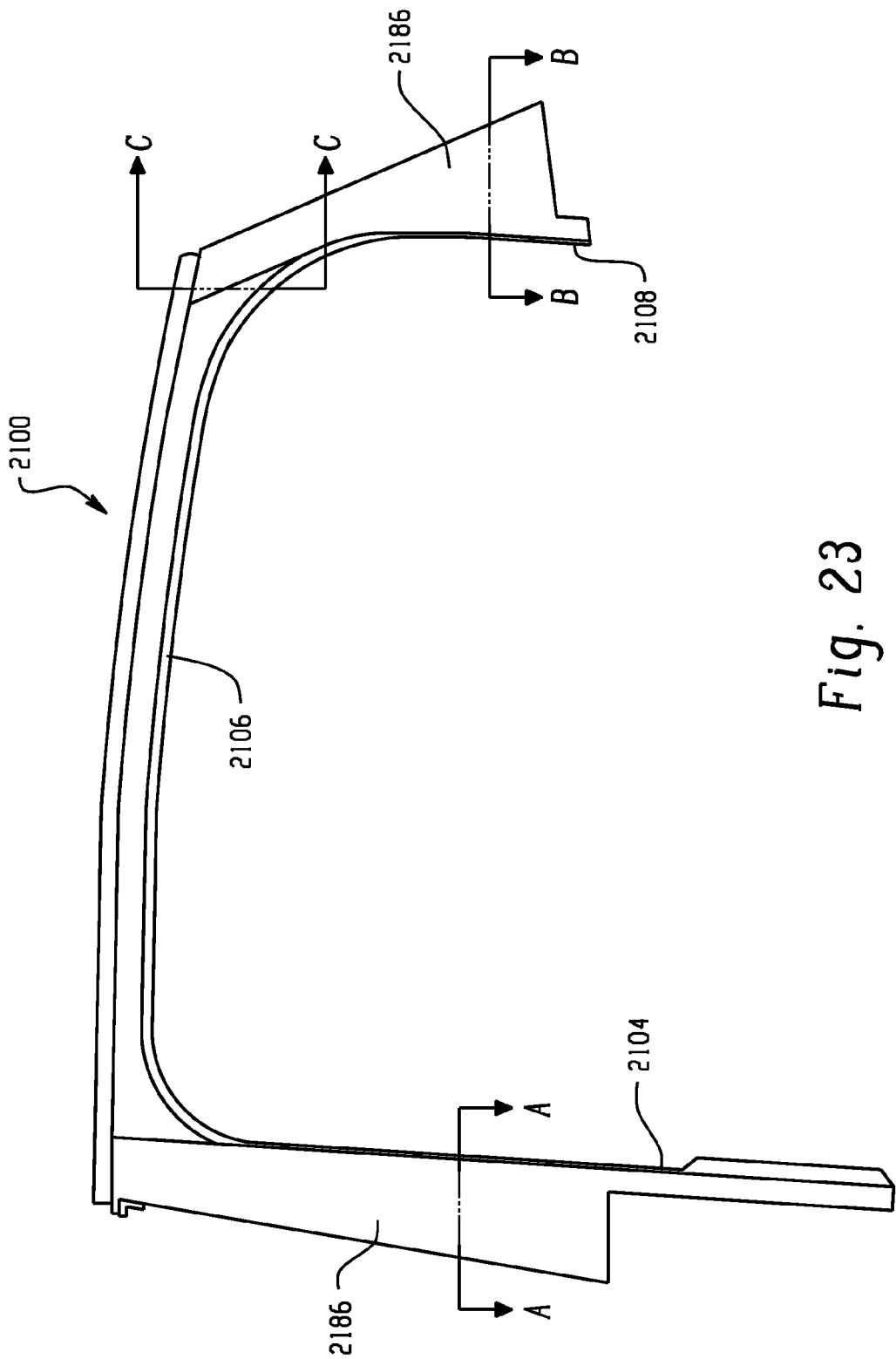
FIG. 23 is an elevational view of a rear door body glass run/appliqué assembly.
Figure 24:
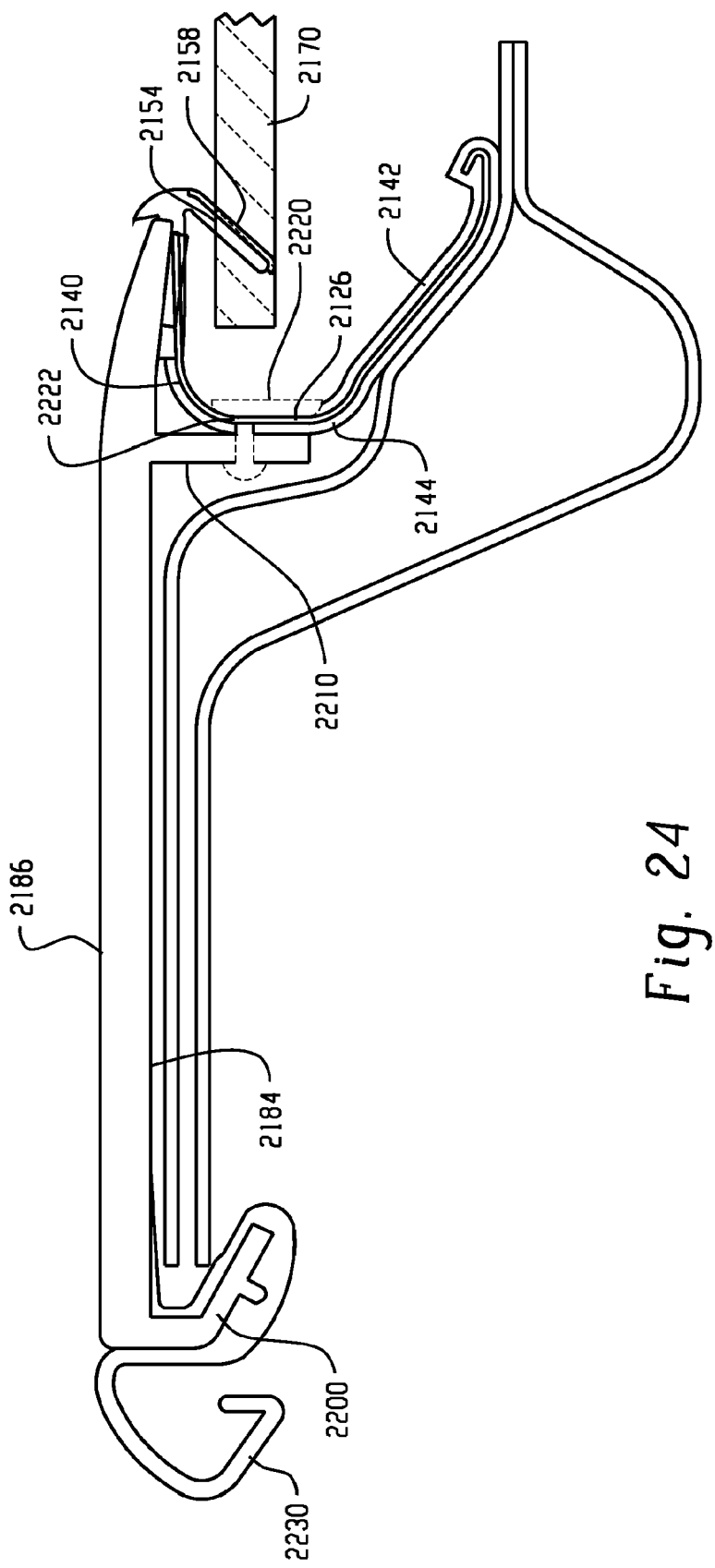
FIGS. 24-26 are sectional views along the lines A-A, B-B, and C-C of FIG. 23.
Figure 25:
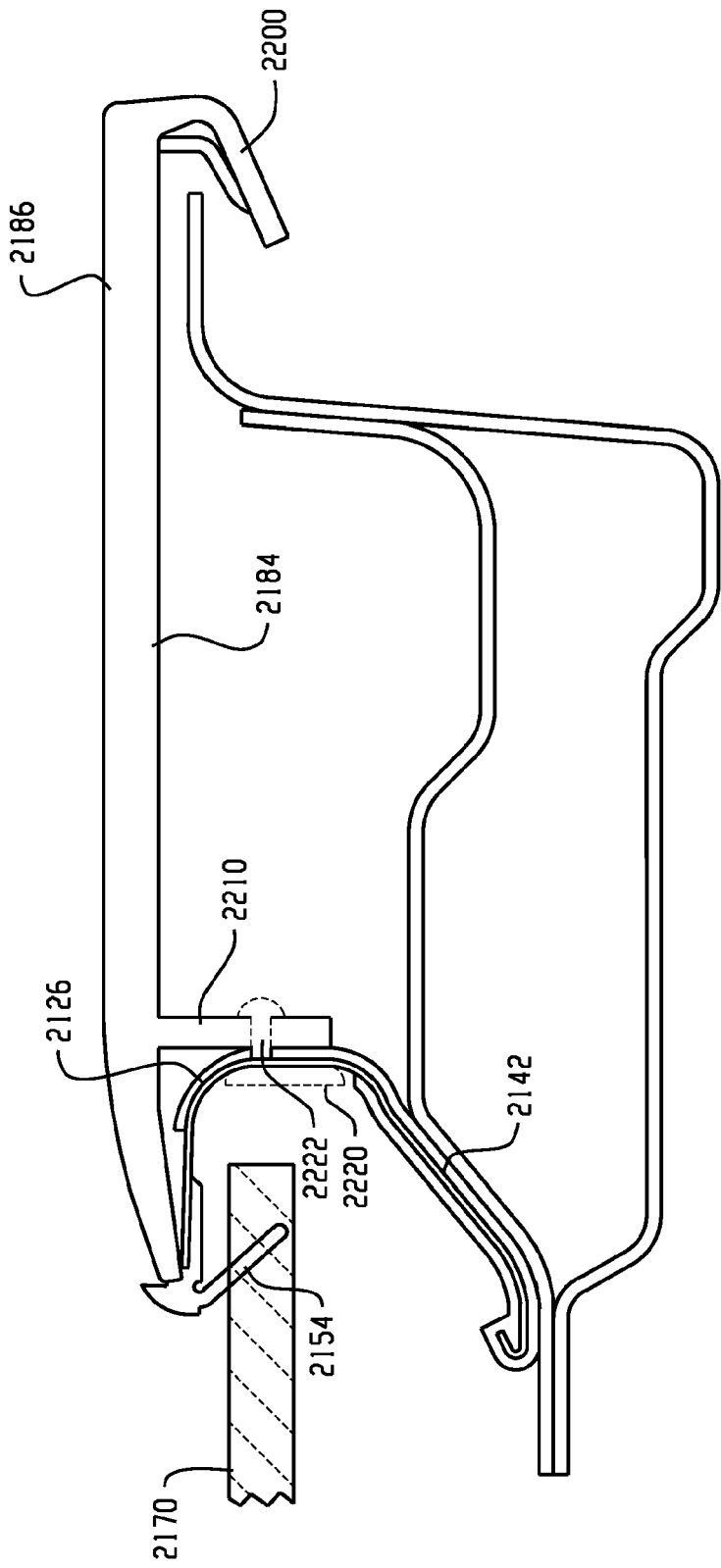
Figure 26:
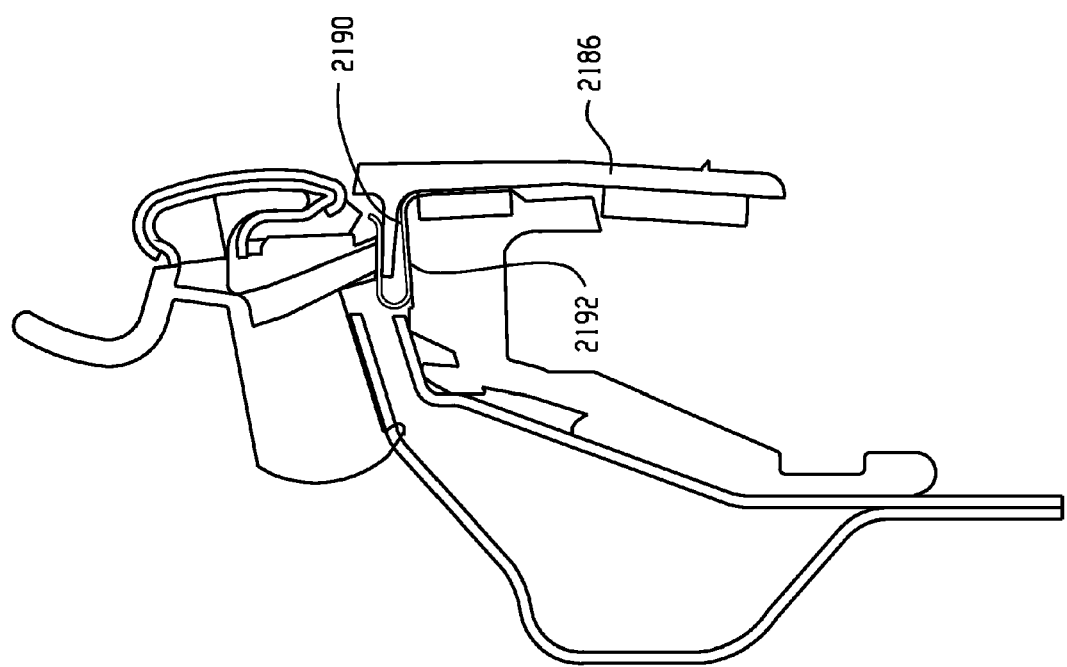

FIG. 23, and the associated cross-sectional views of FIGS. 24-26 illustrate that the assembly is equally applicable to a rear door. Thus, like reference numerals refer to like components. As particularly shown in FIG. 24, the hook 2200 of the appliqué may also be suitably modified to incorporate a cutline seal 2230 along the edge of the appliqué remote from the glass run attachment. Further, FIG. 26 illustrates the use of projections or pins 2190 at desired locations of the appliqué to secure the module to the vehicle. Here, the projection 2190 cooperates with an associated clip 2192 to join the appliqué to the glass run header adjacent the C-pillar portion.

Figure 29:
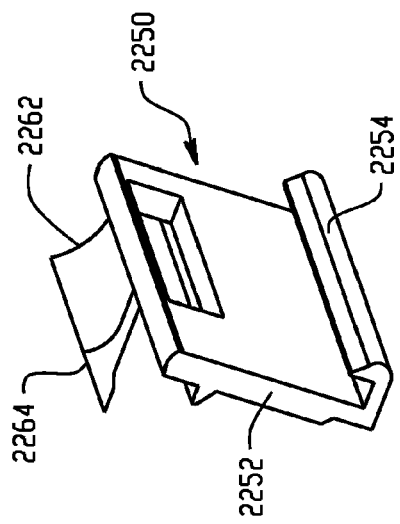
FIG. 29 is a perspective view of a clip.
Figure 28:
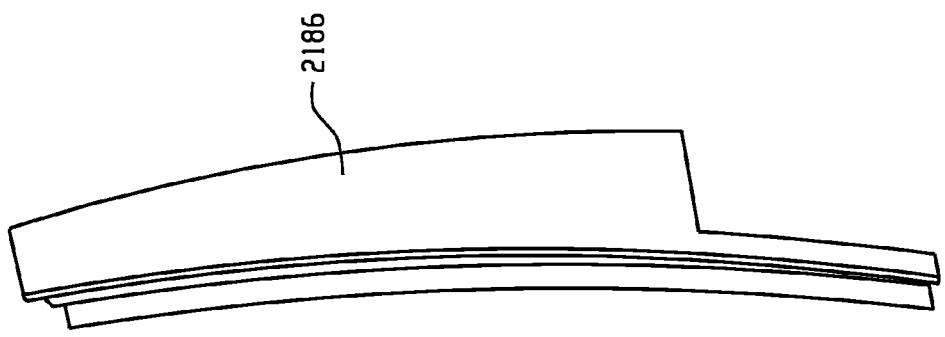
FIG. 28 is a perspective view of an appliqué that receives the clip of FIG. 27.
Figure 30:
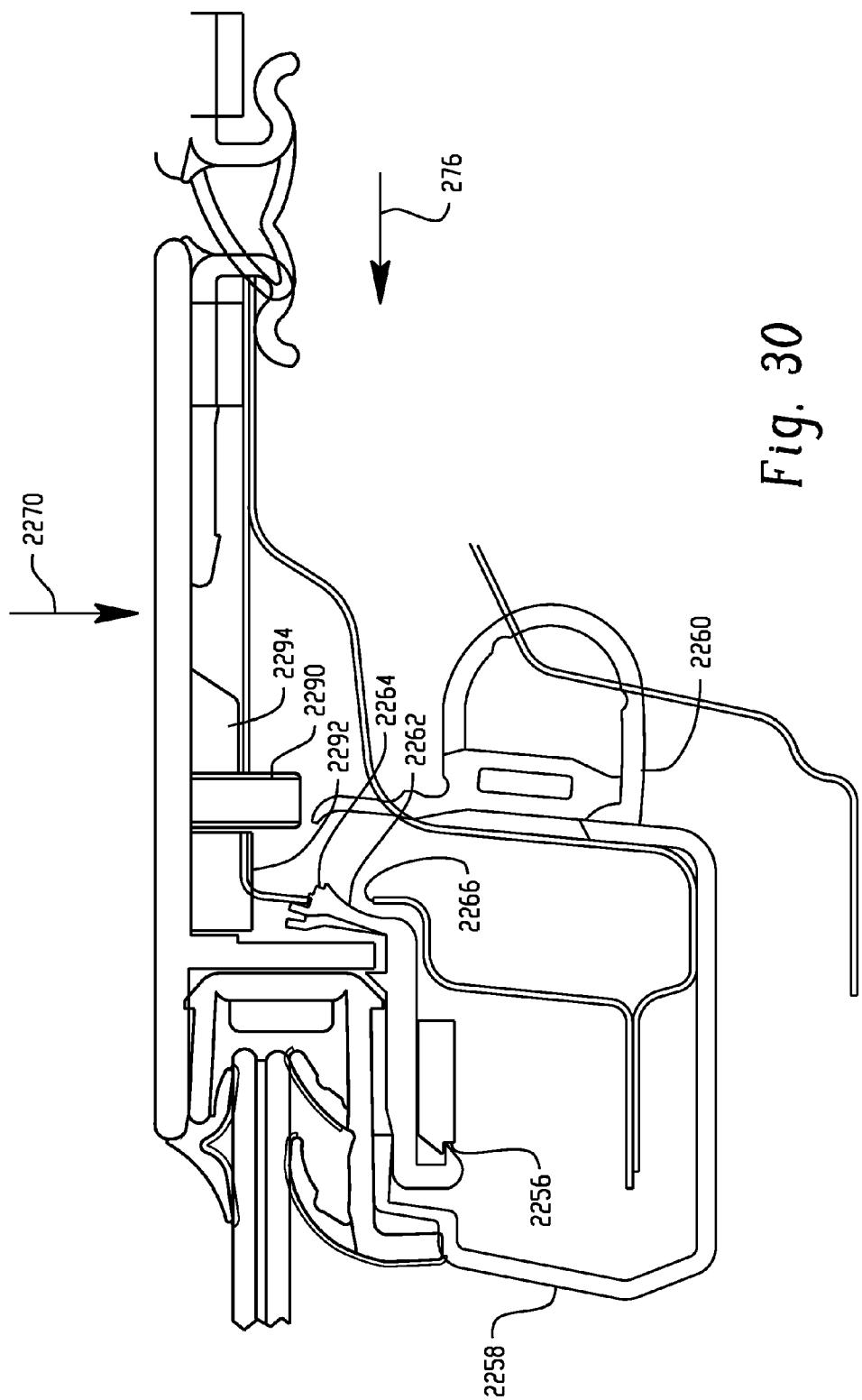
FIG. 30 a sectional view through the glass run/appliqué assembly along the B-pillar.
Figure 31:
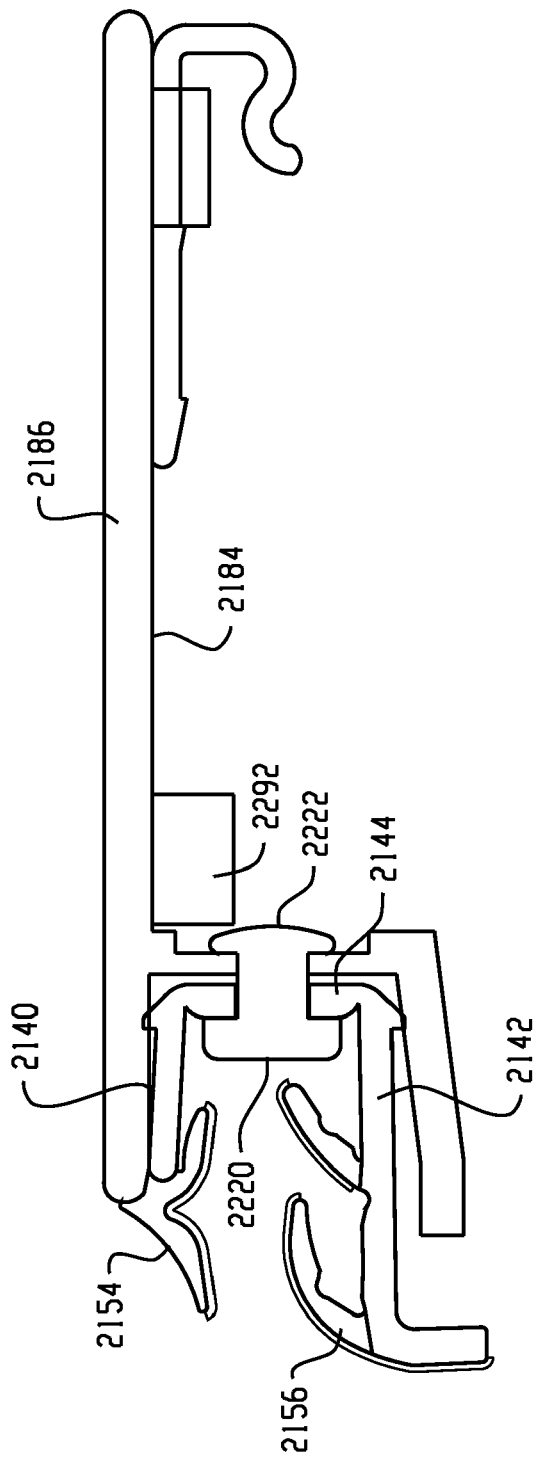
FIG. 31 is a view similar to FIG. 30 through the heat stake connector (and with selected portions of the door removed for ease of illustration).

FIGS. 29 and 30 illustrate the use of additional clips to secure the glass run (and the attached appliqué) to the vehicle. Such a clip 2250 is illustrated in the perspective view of FIG. 29, and in cross-sectional, installed view in FIG. 30. Particularly, body 2252 of the clip has a first hooked edge 2254 that interlocks with shoulder 2256 (FIG. 30) of the garnish and is joined to the glass run assembly. The garnish 2258 covers the door flanges along the pillar region and also provides for support of the door seal 2260. In addition, the clip includes a locking leg 2262 that includes a serrated edge 2264 received through an opening 2266 in the vehicle metal to secure the glass run assembly, and garnish to the metal flange. As the modular assembly is advanced in the direction of reference arrow 2270 (FIG. 30), i.e., in a generally perpendicular direction toward the surface of the vehicle pillar, the leg 2262 deflects toward the glass run assembly and the serrated edge 2264 progressively "clicks" or advances into the opening 2266 to mechanically secure the assembly to the metal flange opening 2266. This, in conjunction with the locator pin 2290 and the mechanical engagement between the glass run and appliqué, provides for precision fit of the modular assembly to the vehicle (FIGS. 31-33). Moreover, a compressible member such as a foam piece 2292 extends outwardly from the surface 2184 of the appliqué. The foam piece 2292 is compressed as the appliqué is advanced toward the pillar and a stop 2294 disposed on the same surface 2184 limits further advancement of the appliqué toward the pillar.

In addition, the connection member 230 of the embodiment of FIGS. 1-12 cooperates with the pillar portions 234 so that detent connection member 254 and associated shoulders 256, 258 allow the second leg 260 to be advanced in an open, extended relation while the modular assembly is inserted in the direction shown by reference arrow 2270, and then an application force provided in the direction 276 that moves the fastener portion relative to the appliqué.

In summary, the modular assembly comprising the glass run assembly and appliqué are joined as a one piece assembly and shipped to the OEM as one piece. The modular assembly is advanced against the pillar in the direction signified by reference arrow 2270. Locator pins 2290 provide for initial location of the modular assembly relative to the pillar. The leg 2262 of the retention clip then provides an audible "click: and feedback to the assembler that the glass run edge of the appliqué has been secured in place. Thereafter, the assembly line installer can move the clip 260 in the direction of arrow 276 to a locked position, as shown in FIG. 30.

Figure 35:
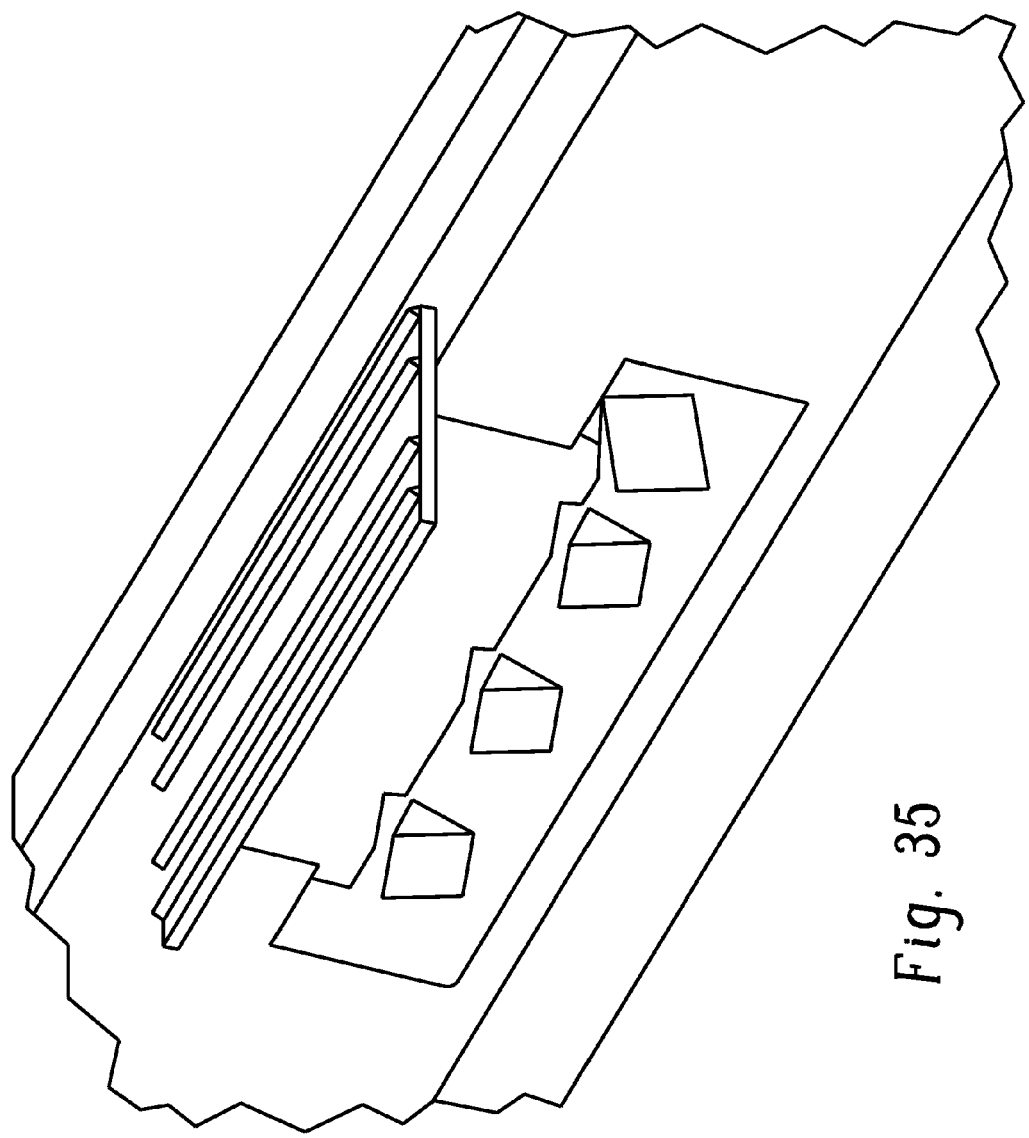

The embodiment of FIGS. 34-36 shows yet another manner of interconnecting the glassrun assembly 3102 with the appliqué portion 3186. Reference numerals in the "3000" series are used to describe like components for consistency and comparison purposes. Extending from a rear face 3184 of the appliqué portion 3186, is a clip 3300 that includes an enlarged end or shoulder 3302 that engages an opening 3304 in a base 3144 of the supported glassrun. As evident in FIG. 34, three clips 3300 are provided in longitudinally spaced positions along the appliqué to mechanically join the appliqué via three similarly spaced openings 3304 to the glassrun and form a modular assembly.

The invention has been described with reference to the preferred embodiment. Modifications and alterations will occur to others upon reading and understanding this specification. It is intended to include all such modifications and alterations in so far as they come within the scope of the appended claims or the equivalents thereof.

What is claimed is:

1. A combined glass run and applique assembly for an associated vehicle comprising:
an applique having first and second generally planar surfaces dimensioned for overlying relation with an associated B-pillar that extends between first and second windows of an associated vehicle, the applique first surface facing the associated B-pillar and the second surface facing outwardly from the vehicle, the applique having a first edge that extends along the first window and a second edge that extends along the second window, the second edge including a hook for covering receipt of an edge of the pillar along the second window, at least one locator extending perpendicularly outward from the first surface of the applique for receipt in a corresponding at least one recess of the associated B-pillar, and a J-shaped fastener that is selectively advanced in a direction parallel to the applique first and second surfaces to secure the applique to the associated B-pillar;
a glass run for receiving perimeter portions of the first window of the associated vehicle window; and
a mechanical engagement assembly interconnecting the first edge of applique and the glass run.

2. The assembly of claim 1 wherein the mechanical engagement assembly includes a groove in one of the glass run and the applique, and a projection in the other of the glass run and the applique dimensioned for receipt in the groove.

3. The assembly of claim 2 wherein the groove has substantially perpendicular portions that receive a substantially perpendicular portion of the projection.

4. The assembly of claim 3 wherein the groove and the projection are each substantially T-shaped.

5. The assembly of claim 2 further comprising a support to which the applique and the glass run are operatively connected.

6. The assembly of claim 5 wherein the support includes a generally U-shaped channel that receives a generally U-shaped elastomeric portion of the glass run.

7. The assembly of claim 6 wherein the support includes a flange secured to the channel.

8. The assembly of claim 1 further comprising spring clips received in respective pillar recesses that receive one of the locators.

9. The assembly of claim 1 further comprising a support to which the applique and the glass run are operatively connected, and the mechanical engagement assembly includes a pin interconnecting the applique and the glass run.

10. The assembly of claim 9 wherein the mechanical engagement assembly further includes a projection extending from the applique and abutting with a portion of the glass run.

11. The assembly of claim 10 wherein the pin extends through the projection and the glass run.

12. The assembly of claim 11 wherein the pin includes a deformed end having a dimension greater than the aligned openings.

13. The assembly of claim 9 the pin includes an enlarged dimension, deformed end for retaining the applique to the glass run.

14. The assembly of claim 13 wherein the deformed end of the pin is sonically welded.

15. The assembly of claim 13 wherein the deformed end of the pin is cold headed.

16. The assembly of claim 9 further comprising spaced locators that extend outwardly from the applique for operative engagement with similarly spaced recesses in a pillar of the associated vehicle.

17. The assembly of claim 1 further comprising a seal extending along the hook.

18. The assembly of claim 1 further comprising at least one clip for securing the glass run to the associated vehicle.

19. The assembly of claim 18 further comprising a support to which the applique and the glass run are operatively connected, and wherein the clip includes a first edge that includes a serrated edge that progressively advances into an associated opening in the support.

20. The assembly of claim 19 wherein the serrated edge of the clip provides an audible click to evidence that assembly is complete.

21. The assembly of claim 1 wherein the hook of the applique is received over a distal edge of the pillar spaced from the glass run.

22. A method of securing a glass run and applique assembly to an associated vehicle comprising:
dimensioning an applique for overlying relation with a vehicle pillar that extends between first and second windows of an associated vehicle, the applique having first and second generally planar surfaces, the applique first surface facing the associated B-pillar and the second surface facing outwardly from the vehicle, the applique further including a first edge that extends along the first window and a second edge that extends along the second window, the second edge including a hook for covering over an edge of the pillar along the second window, and at least one locator extending perpendicularly outward from the first surface of the applique for receipt in a corresponding at least one recess of the associated B-pillar;
advancing the applique toward the associate B-pillar in a direction parallel to the locator to align the at least one locator in the associated at least one recess;
securing one of the first and second edges of the applique over an edge of the associated B-pillar to cover front and rear surfaces thereof;
providing a glass run for receiving perimeter portions of the first window; and
mechanically engaging the applique to the glass run.

* * * * *